(12) United States Patent
Ramamurthi et al.

(10) Patent No.: US 9,092,537 B2
(45) Date of Patent: Jul. 28, 2015

(54) METHOD AND SYSTEM FOR GENERATING SEARCH URLS

(75) Inventors: Shiv Ramamurthi, San Francisco, CA (US); Reiner Kraft, Sunnyvale, CA (US)

(73) Assignee: YAHOO! INC., Sunnyvale, CA (US)

(*) Notice: Subject to any disclaimer, the term of this patent is extended or adjusted under 35 U.S.C. 154(b) by 626 days.

(21) Appl. No.: 12/882,561

(22) Filed: Sep. 15, 2010

(65) Prior Publication Data

US 2012/0066256 A1 Mar. 15, 2012

(51) Int. Cl.
*G06F 17/30* (2006.01)
(52) U.S. Cl.
CPC .... *G06F 17/30893* (2013.01); *G06F 17/30864* (2013.01)
(58) Field of Classification Search
CPC ............... G06F 17/30864; G06F 17/30905; G06F 17/30893
USPC ............. 707/771, 999.003, 779, 803, 809
See application file for complete search history.

(56) References Cited

U.S. PATENT DOCUMENTS

| 6,665,658 | B1* | 12/2003 | DaCosta et al. ............... 1/1 |
| 7,178,101 | B2* | 2/2007 | Tunning ...................... 715/236 |
| 2003/0221162 | A1* | 11/2003 | Sridhar ....................... 715/501.1 |
| 2008/0133505 | A1* | 6/2008 | Bayley et al. .................. 707/5 |
| 2009/0234814 | A1* | 9/2009 | Boerries et al. ................ 707/3 |
| 2009/0234815 | A1* | 9/2009 | Boerries et al. ................ 707/3 |
| 2009/0327914 | A1* | 12/2009 | Adar et al. ................... 715/745 |
| 2010/0082594 | A1* | 4/2010 | Bhat et al. ................... 707/707 |
| 2010/0180192 | A1* | 7/2010 | Hall ........................... 715/234 |
| 2010/0299325 | A1* | 11/2010 | Tzvi et al. ................... 707/728 |
| 2011/0213655 | A1* | 9/2011 | Henkin et al. ............ 705/14.49 |

* cited by examiner

*Primary Examiner* — Phong Nguyen
(74) *Attorney, Agent, or Firm* — Pillsbury Winthrop Shaw Pittman LLP

(57) ABSTRACT

Method and system for generating dynamic content. A request and associated information is received for generating a dynamic content page (DCP). The DCP is generated by a DCP generation engine by integrating a number of pieces of content accessible from respective sources. The content pieces to be included in the DCP are identified and arranged in a fashion consistent with the request and the associated information. A locator is then associated with the DCP, so that the DCP can be subsequently located through the locator. Such generated DCP and/or locator are provided as a response to the search query.

32 Claims, 17 Drawing Sheets

Fig. 5(b)

METHOD AND SYSTEM FOR GENERATING SEARCH URLS

BACKGROUND

1. Technical Field

The present teaching relates to methods, systems and programming for providing dynamic Internet content.

2. Discussion of Technical Background

The tremendous advancement in the world of the Internet has made it possible for a user to electronically access virtually any content. With the explosion of information, it has become more and more challenging to find desired information. For example, a user may search desired content via a search engine by specifying a query which usually includes one or more keywords. Technologies have been developed that can be used to estimate the intent of the user based on a query or other related information, such as a profile of the user or query history of the user, to enhance the quality of the search result. Although improvements have been observed in terms of relevance of the identified content, the traditional ways to search content have created a bottleneck to providing more significant enhancements. In addition, on many occasions, what a user desires is more than a simple list of individual and stand alone pieces of information that a conventional search engine typically returns. For example, a user may desire to gather all the useful information associated with whale watching in Monterey, such as whale watching in general, specific information about whale watching in Monterey, the location of such activity in Monterey, and a weather forecast for Monterey. To get such information from a traditional search engine, the user may enter a query "whale watching in Monterey". In this example, the traditional search engine likely will return a list of URLs (uniform resource locators), where each of several of the pages or websites identified by URL has some information that the user desires. For instance, some of the URLs may link to articles talking about whales or whale watching in general, different ones of the pages or websites identified by the URLs may relate to information about Monterey, some may relate to some specific whale watching activity offered in Monterey, and some may relate to information about Monterey such as weather or other activities offered in that area. Those URLs are returned because each has some occurrences of one or more of the keywords specified in the query. To gather different aspects of what the user desires to know, the user has to review information scattered on different web sites by clicking on more than one URL link, in order to take down all the useful information. It is a tedious, time consuming, and awkward process.

Given the vast amount of information available today on the Internet, there is a need for organizing content in an integrated manner dynamically and in accordance with what users actually desire, so that users can mine the information available on the Internet in a more efficient and effective manner.

SUMMARY

The teachings disclosed herein relate to methods, systems, and programming for search URLs.

In one example, a method, implemented on a machine having at least one processor, storage, and a communication platform connected to a network for generating dynamic content, is disclosed. A request is received, via the communication platform, with associated information to generate a dynamic content page (DCP). A DCP generator, running on one of the at least one processor, generates the DCP by integrating a plurality of pieces of content accessible from respective sources, identified and arranged consistent with the request and the associated information. A locator generator, running on one of the at least one processor, associates a locator with the DCP so that the DCP can be subsequently located through the locator. The locator and/or the DCP is then provided as a response to the request.

In a different example, a method implemented on a machine having at least one processor, storage, and a communication platform connected to a network for a search engine, is disclosed. A dynamic content page (DCP) generation engine, running on one of the at least one processor of the machine, generates a DCP by integrating a plurality of pieces of content accessible from respective sources, identified and arranged based on a characterization of a topic theme, wherein the DCP is made subsequently locatable via an associated locator. When the search engine receives, via a platform for interfacing with users, a query from a user, the search engine analyzes, via a query analyzer, the query to obtain a characterization of the query and searches, via a content search platform running on the at least one processor, one or more pieces of content, including a DCP via its associated locator, based on the characterization of the query. The search engine then returns the one or more pieces of content to the user as a response to the query.

As a different example, a method implemented on a machine having at least one processor, storage, and a communication platform connected to a network for a content provider, is disclosed. An archive comprising different pieces of content, each of which can be located via a locator, is provided. A dynamic content page (DCP) generation engine, running on one of the at least one processor of the machine, generates a DCP by integrating a plurality of pieces of content from the archive or another source, identified and arranged in accordance with a request, wherein the DCP is associated with a locator through which the DCP is subsequently locatable. The archive is updated by including the DCP as one of the different pieces of content in the updated archive and is provided for access, including an access to the DCP via the locator.

In another example, a system for creating dynamic content is disclosed, which includes a dynamic content page (DCP) generator configured for generating a DCP based on a request, wherein the DCP comprising a plurality of pieces of content from respective sources, identified and arranged in accordance with the request, a locator generator configured for associating a locator created with respect to the DCP so that the DCP can be subsequently located via the locator, and a communication platform through which the locator and/or the DCP is provided as a response to the request.

As another example, a system for a search engine is disclosed, which includes a dynamic content page (DCP) generation engine configured for generating a DCP based on a plurality of pieces of content accessible from respective sources, identified and arranged in the DCP based on a characterization of a topic theme, wherein the DCP is made subsequently locatable via an associated locator, a platform configured for interfacing with a user to receive a query and return a search result as a response to the query, a query analyzer configured for analyzing the query to obtain a characterization of the query, and a content search platform configured for searching one or more pieces of content based on the query, including a DCP via its associated locator, based on the characterization of the query.

In another different example, a system for a content provider is disclosed, which includes a computerized and machine accessible archive comprising different pieces of content, each of which can be located via an associated locator and a dynamic content page (DCP) generation engine configured for generating, based on a request, a DCP by integrating a plurality of pieces of content from the archive or another source, identified and arranged in accordance with a request, wherein the DCP is associated with an associated locator, through which the DCP is made subsequently locatable. The system for the content provider also includes an archive updating mechanism configured for generating an updated archive by including the DCP as one of the accessible different pieces of content in the archive and a platform for interfacing with users configured for providing an access to the updated archive.

In yet another example, a machine readable non-transitory and tangible medium having information recorded thereon for generating dynamic content, wherein the information, when read by the machine, causes the machine to perform functions including receiving a request with associated information to generate a dynamic content page (DCP) and generating, by a dynamic content generator running on one of the at least one processor, the DCP comprising a plurality of pieces of content accessible from respective sources, identified and arranged consistent with the request and the associated information. Execution of the instructions also causes the machine to associate, by a locator generator running on one of the at least one processor, a locator with the generated DCP, wherein, through the locator, the DCP can be subsequently located and provide the locator and/or the DCP as a response to the request.

Another example disclosed is a machine readable non-transitory and tangible medium having information recorded thereon for a search engine, wherein the information, when read by the machine, causes the machine to perform functions including generating a dynamic content page (DCP) by integrating a plurality of pieces of content accessible from respective sources, identified and arranged in the DCP based on a topic theme, wherein the DCP is made locatable via an associated locator. Execution of the instructions also causes the machine to receive a query from a user, analyze the query to obtain a characterization of the query, search one or more pieces of content based on the characterization of the query, including a DCP that is locatable via an associated locator, and return the one or more pieces of content to the user as a response to the query.

As in yet another different example, a machine readable non-transitory and tangible medium having information recorded thereon for a content provider, wherein the information, when read by the machine, causes the machine to perform functions including providing an archive comprising different pieces of content, each of which can be located via a locator and generating, via a dynamic content page (DCP) generation engine running on one of the at least one processor of the machine, a DCP by integrating a plurality of pieces of content from the archive or another source, identified and arranged in accordance with a request, wherein the DCP is associated with a locator so that the DCP is subsequently locatable. Execution of the instructions also causes the machine to generate an updated archive by including the DCP as one of the different pieces of content in the updated archive and provide an access to the updated archive.

Other concepts relate to software for implementing the generation of search URLs. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 5(a)-5(d) show different exemplary templates and dynamic web pages created based on the templates;

DETAILED DESCRIPTION

Figure 1:
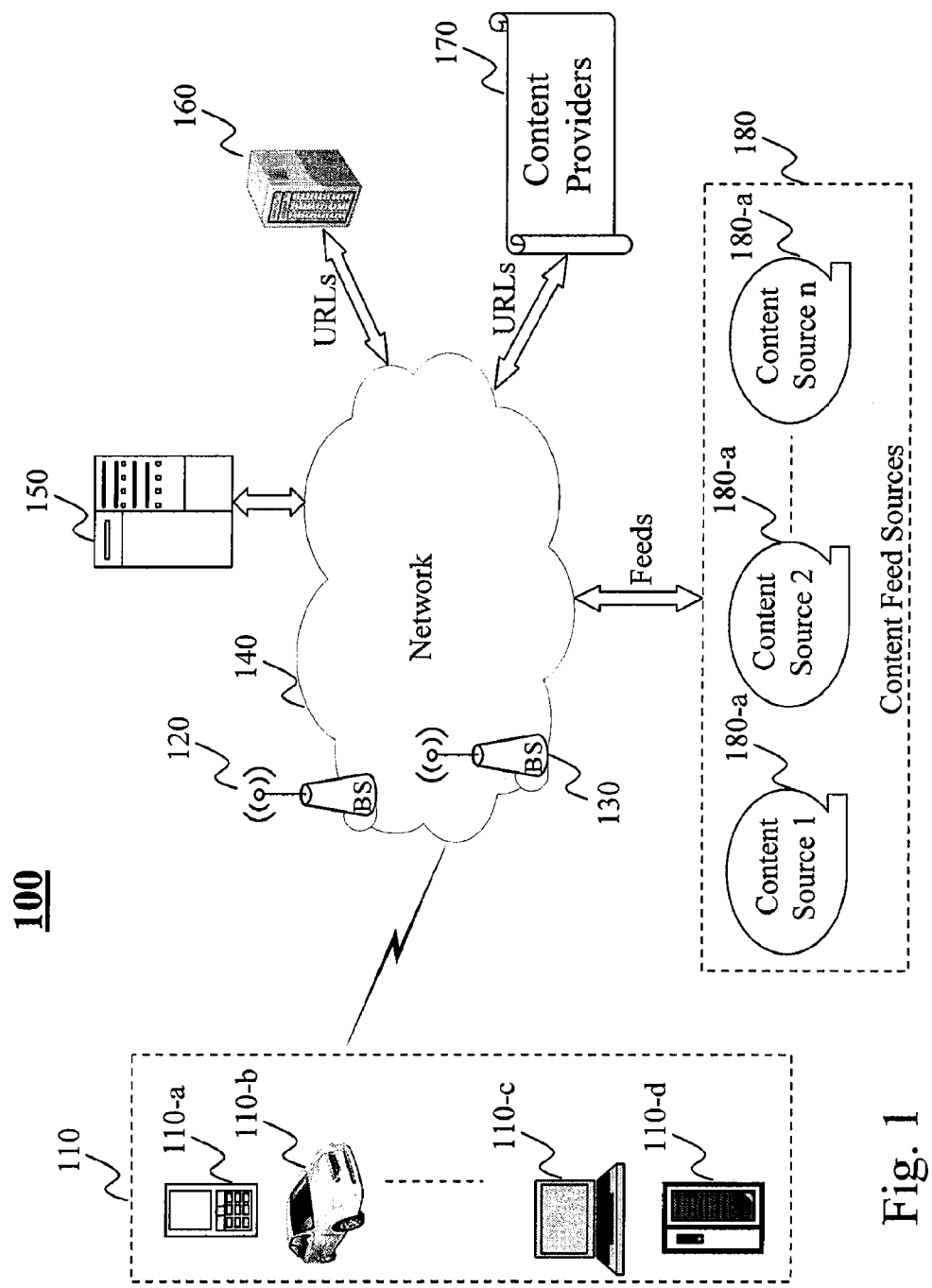
FIG. 1 depicts an exemplary architecture of a system in which DCPs (dynamic content pages) can be generated and made subsequently accessible to users.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to dynamically generating a dynamic content page (DCP) having multiple pieces of information from different sources arranged in a certain way on the page. The selection of those multiple pieces of information and the arrangement thereof are in accordance with a template, which is created consistent with a topic or characterization of a theme, either pre-determined or estimated on-the-fly based on a query initiated from a user. A piece of content to be included in a DCP may be a piece of text, a locator such as a URL, a map, an image, an animation, a piece of audio or a video clip that can be played back, a message, or any combination thereof.

The template may be determined or created based on an estimation of a focal point of the underlying DCP. Continuing with the earlier example, although "whales" may be a topic, there may be different focal points associated with that topic, e.g., whale watching as an entertainment activity or research on whale's social behavior. A focal point may affect both the selection of the pieces of content to be included in a DCP and how those pieces of content are to be arranged within a DCP. Each piece of the content included in the DCP may be located at a source via a locator, such as a Universal Resource Locator (URL). Such a DCP, once created, may itself be located and accessed via the locator, for example, in the context of a web content search.

There may be different ways of generating a DCP. In some examples, a DCP may be generated as a full page by placing the multiple pieces of content from different sources in the DCP according to a layout specified by a template. Such a full page may be stored and indexed for future accesses. In some examples, a DCP may be generated as a holder of locators for different pieces of content that compose the DCP. In such a skeleton DCP, each piece of content designated to be displayed at a certain location within the DCP is represented by its locator such as a URL (rather than the content itself). In such embodiments, the DCP is not rendered in full until a user accesses the DCP (e.g., by clicking on the URL of the DCP). When this occurs, each URL corresponding to a piece of content within the DCP is then accessed and the content from that URL is then retrieved and rendered at a specified location within the DCP. When a DCP operates in this manner, all the content within the DCP corresponds to the most updated or fresh content at the moment of the current access.

A DCP may include both content from a static source (static content) or content from an active source (active content). Examples of static sources may include the headline stories from CNN.com or an article on a particular subject published on a web site. Although static content may correspond to the most updated content from a certain source at the time of the access, once it is rendered on the DCP, it is not dynamically updated during the same viewing session. However, active content likely needs to be dynamically updated even within the same viewing session. Examples of active content includes stock price quotes, online chat, twitter, or updates on the presence of peers within the range of a device whose user requested the DCP content. In addition, if a user who is viewing a DCP actively participates, for example, in a chat with some members of a particular social group, the user's input and the inputs from other participants may be dynamically reflected on the DCP. Therefore, a DCP having such active content is a "living" page.

Both the underlying topic and a focal point may affect the creation of a template that governs the generation of a DCP. A template includes a specification of both multiple pieces of content that are to be used to compose a DCP and a spatial arrangement (or layout) of the multiple pieces of content. Such specification is determined with respect to the underlying topic of interest and the focal point of the DCP. Whenever there is a change in the topic or focal point associated with an existing template, the template may be adapted to such a change. For instance, if a user wants to buy a new car and at the same time sell his used car, a DCP may be customarily generated to meet the user's needs based on a template that has a topic "cars" and an initial focal point of "selling a used car". On the customized DCP, articles, advertisements, or URLs linked to web pages of different car dealers that sell cars and car auction sites may be composed together to provide focused information to the user. This customized DCP has a stable URL so that it may be accessed multiple times. Due to the DCP being a living page, each time this DCP is accessed, the most updated car sale and auction information can be accessed and presented to the user Subsequently, when the user completes a transaction on the DCP to sell his used car (which can be detected through the user's activities on the DCP), both the content to be included in the DCP and the focal point need to be adapted. In this case, the focal point of the underlying template may be adapted to be "buying a new car" and this new focal point may lead to changes in both the content to be included in the DCP (e.g., it no longer needs to access information on used car auctions) and the layout of the DCP (it no longer needs the area to present used car auction information).

Updating the template and the active content associated with a DCP may be triggered based on a detection of a change, which can be an input from a user viewing the DCP, a transaction completed on the DCP, a message sent by another directed to the user who is viewing the DCP, or an indication that another associated with the user viewing the DCP is coming within or going away from an accessible range. To detect such a change, dynamic information may be gathered and analyzed over time to see whether the collected information indicates a change. Some changes can be recognized as meaningful upon detection, e.g., a user's input. Some changes may not clearly signal significance in individual instances but cumulatively, they may. For example, individual clicks from a user on a particular URL link presented on a DCP may not mean much but repeated clicks on the same URL may indicate that the content associated with the URL may need to become the focal point of the DCP if it has not already been.

Other concepts relate to unique software for implementing the one or more of the dynamic content page generation techniques. A software product, in accord with this concept, includes at least one machine-readable medium and information carried by the medium. The information carried by the medium may be executable program code regarding generating a DCP, associating a URL or other locator with the DCP and, in some cases at least, updating the DCP when necessary.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

FIG. 1 is an exemplary architecture of a system 100 in which DCPs can be generated and made subsequently accessible to users, according to an embodiment of the present teaching. In system 100, users' devices, shown at 110, are connected to other networked components through a wireless and/or landline network 140. In the system 100, the network 140 also provides communication connectivity to various content providers 170, content feed sources 180, a search engine 150, and a DCP generation engine 160. In this example, the content providers 170, the content feed sources 180, and the DCP generation engine 160 are capable of creating and directly providing content to users 110 via the network 140. Content may also be provided to the users 110 via the search engine 150, which gathers information about content from the content providers 170, the content feed sources 180, or the DCP generation engine 160 and delivers such information to the users 110. Users 110 may request or access content via different platforms offered on their respective access devices such as a handheld device 110-a, a communication platform installed in a mobile vehicle 110-b, or a browser or other access platform implemented on a computer such as a laptop 110-c or a desktop computer 110-d.

The network 140 can be a single network or a combination of different networks, which can be a local area network (LAN), a wide area network (WAN), a public network, a private network, a proprietary network, a Public Telephone Switched Network (PSTN), the Internet, a wireless network, a virtual network, or any combination thereof. The network 140 may also include various network access points, such as wired or wireless access points such as base stations 120 and 130 or Internet exchange points, through which a user can connect to the network in order to reach other parties connected therewith.

In the system 100, the users 110 may request or obtain content either directly from content sources where content is generated or created or via the search engine 150 that can assist a user to identify a selectable subset of available content based on, e.g., a query or other information associated with the query or the user. In the context of web content, a user can access content in different forms. For instance, a user may access a piece of content via a locator such as a URL that represents the content such as content from the content providers 170 or the DCP generation engine 160. A user may also receive content itself directly, for example, through feed sources such as 180-a, 180-b, . . . , 180-c or from a content provider 170.

Traditionally, each piece of content is created by a content creator (either a content provider or a feed source) with some underlying topic or focus. Although there may be many pieces of content that all have a similar underlying topic with possibly varying view points or emphasis in each, they are scattered throughout the network(s). Via a search engine, it is possible for a user to gather different pieces of content having some similarities through a single access point (the search engine). However, to actually find the piece of desired content requires the user to individually look at different pieces of content identified from the search and make that assessment, which is time consuming and cumbersome. In addition, in some situations, a user's need can be much better served by a plurality of pieces of content that, although seemingly different, are linked by a common theme that fits the user's desire. For instance, if a user is seeking information related to whale watching in Monterey, Calif., the user may enter "whale watching Monterey" as a query. A traditional search engine, upon processing the query, usually provides a list of URLs, each of which relates to some publication relating to either Whale watching or Monterey. If the user is considering going whale watching in Monterey, a web page forecasting weather near Monterey may also be useful. In this case, a traditional search engine is unlikely to return a URL related to the weather forecast. Instead, the user has to perform another search to get that information. If the user further wants to find out whether there are environmental groups that have special interest in whales, most likely the user has to perform another search with a different query in order to get the information related thereto. Hence, to meet a need for somewhat diverse information on a particular theme or topic, a user of a traditional search engine usually has to perform multiple searches and look at quite a few different pages from the various search results in order to gather all the information that the user actually desires.

In accordance with the present teaching, the DCP generation engine 160 is provided to create DCPs that integrate multiple pieces of content from different sources, which are related to a common topic. The DCP generation engine 160 is not a content provider in the normal sense. Rather than creating original content like that from a content provider in the traditional sense, the DCP generation engine 160 creates a combination or integration of different pieces of content from different sources and/or active content based on an estimation as to what a user desires to know or find. Content integrated in a DCP may also include active content, which may be dynamically updated whenever the situation requires. This makes a DCP not only a content page but also an active communication conduit.

The determination of the pieces of content to be integrated to form a DCP is made based on a theme or a topic that is either pre-determined or estimated, e.g., from a query and information associated with the user, such as user demographics, hobbies, query history, activities, participation in social groups, etc. Continuing with our example, if a topic of interest to the user is whale watching, the pieces of content to be used to compose a DCP for that topic may be from sources like a web site that hosts articles about whales, a web site that lists different locales where whale watching is offered, a weather site offering weather forecasts for the identified locales, and/or a web site that hosts chat rooms for social groups on protection of whales as an endangered species. The content related to the whale protection social group may be included, for example, because the user is known to be a member of such social groups or the user has been actively engaged in blogs on the web on whale protection topics, or perhaps a high percentage of users who go on whale watches also access whale protection sites.

The pieces of content to be included in the dynamic content page may also be determined based on a focal point as discussed herein. For instance, if it is known that a user has recently booked a flight to northern California, a subsequent query about whale watching in Monterey may lead to an estimation that the need is related to a vacation activity. Based on that, looking for entertainment activities in Monterey may become a focal point of a DCP to be generated. In this case, information related to other activities offered by Monterey (rather than more whale related information) may be included in the DCP. In addition, the layout of those pieces of content may also be dynamically determined based on both the topic and focal point. For instance, if whale watching is estimated to be one activity desired by a user on vacation in Monterey and the focal point is different activities one can participate in Monterey, the layout of the DCP may be designed to include different sub-areas showing different activities in Monterey and a map in the center showing where all there activities are located.

The DCP generation engine 160 may operate in different modes. It may generate DCPs on its own initiative with respect to different topics and/or focal points. Such DCPs may be generated off line and stored for future access. A DCP may be stored with a locator, e.g. a URL in the same way as other web content, so that it can be searched and accessed in a subsequent query. Each DCP may be indexed via different criteria, e.g., topic, theme, or focal point. With such indexing and locator, a DCP may be retrieved and provided, upon request, to any party that has needs content on the same or similar topics and/or focal points. In those situations, the locator (URL) of an existing DCP may be returned to the user as a query result.

The DCP generation engine 160 may also generate DCPs on demand. For example, when a query is analyzed with respect to a user who issues the query, a DCP may be dynamically generated on-the-fly and returned to the user as a query result. The DCPs generated on-the-fly may also be stored and indexed for subsequent accesses. Similarly, each such generated DCP may be represented by a locator such as a URL so that it can be subsequently located and accessed. In addition, as discussed herein, whether generated off line on the generation engine's own initiative or on demand responsive to a user query, the created DCPs are live pages because each time when it is accessed, the content used to fill in the page is fresh and updated.

In system 100, the DCP generation engine 160 may relate to other parties (e.g., users 110, search engine 150, content provider 170, etc.) in different ways. For instance, the DCP generation engine 160 may operate independently as a special content provider that, rather than creating original content, generates composite content with a specified topic or focus. In this operational mode, the DCP generation engine 160 may be capable of directly interacting with users and providing DCPs, either previously generated or generated on-the-fly, to users based on their needs.

In some examples, the DCP generation engine 160 may be affiliated with one or more other parties, e.g., the operator of the search engine 150, to supply DCPs to such affiliated parties sites. In this mode of operation, the DCP generation engine 160 may not interact directly with users but rather work as, e.g., a backend of the affiliated parties to generate and provide DCPs customized to meet their user's needs. In this case, the DCP generation engine 160 may receive a request from equipment of an affiliated party with associated information related to DCP to be generated. In some examples, an affiliated party may forward a query and user information to the DCP generation engine 160, and the query and user information is up to the DCP generation engine 160 to estimate the topic or focal point of what is requested and generate a DCP based on the estimated topic or focal point. In some embodiments, an affiliated party may also send the DCP generation engine 160 the underlying topic or focal point based on which the DCP generation engine 160 then creates the template and the DCP. In some examples, an affiliated party may even send a list of URLs the DCP generation engine 160 requesting the engine 160 to create a DCP within the scope of the forwarded URLs.

The DCP generation engine 160 may also be an integral part of equipment of another party shown in FIG. 1. For example, although shown separately, the DCP generation engine 160 may be a part of the search engine 150. In such a case, the search engine such as 150 may respond to a query by searching the network for appropriate content (traditionally done) and execute an associated generation routine for creating multiple DCPs each of which, for example, has a slightly different focal point. To respond to a user's query, the search engine 150 returns a list of URLs, some of which represent individually available pieces of content identified by a traditional search of the network and some of which represent DCPs with integrated contents identified and composed in a manner considered to be consistent with the query but with the different focal points.

In some examples, the DCP generation engine 160 may also be either affiliated with or an integral part of one or more content providers. In those arrangements, the DCP generation engine 160 creates a DCP based on existing content created by the content provider(s) so as to bootstrap each content provider's ability to offer both originally created content and composite DCP content to satisfy different user or provider service needs.

Figure 2:
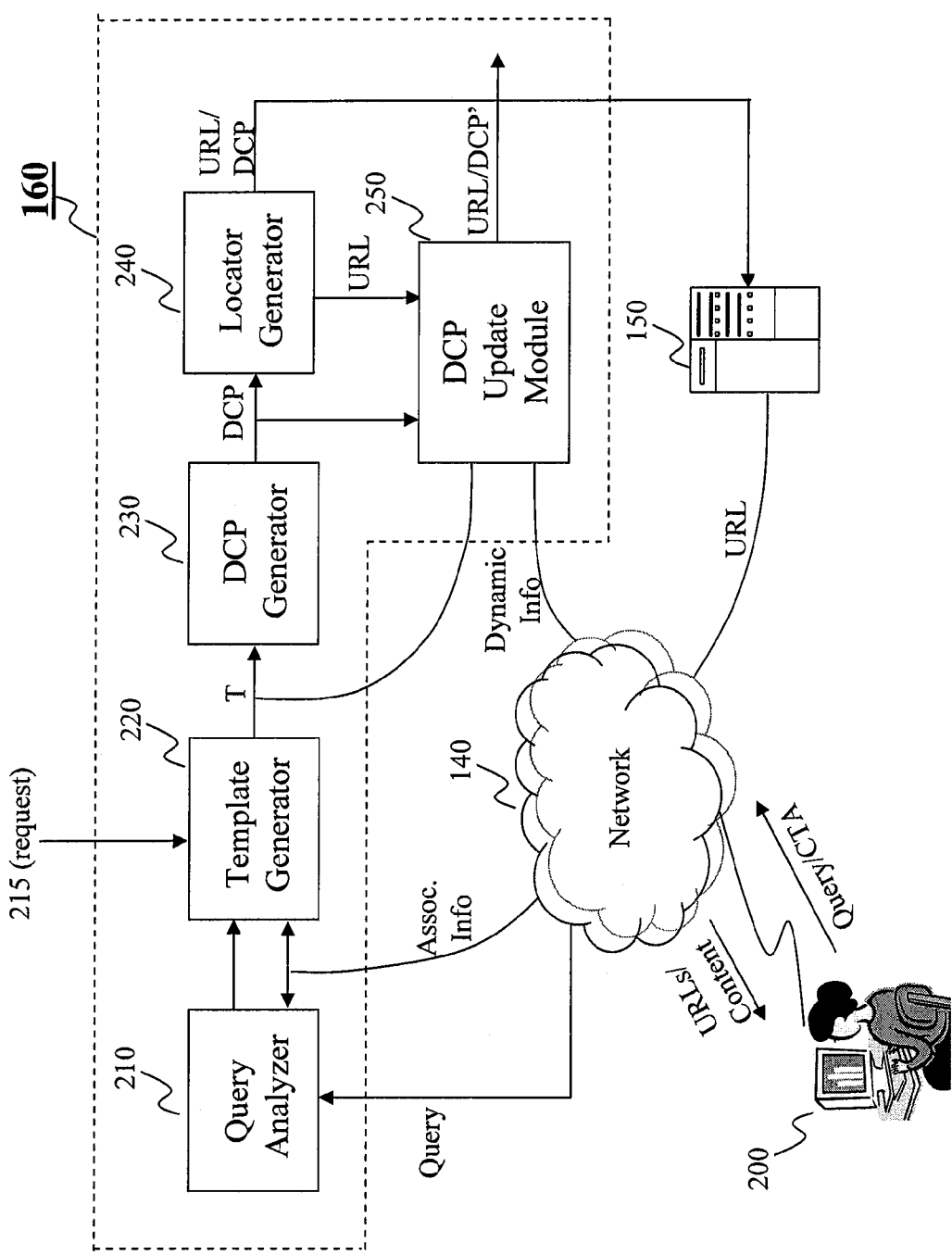
FIG. 2 depicts a networked environment system diagram, including elements of an example of a DCP generation engine.

FIG. 2 is a functional block system diagram, including elements of an example of the DCP generation engine 160, in a networked environment. The exemplary DCP generation engine 160 includes a template generator 220, a DCP generator 230, a locator generator 240, and a DCP update module 250. Optionally, the DCP generation engine 160 may also include a query analyzer 210, which is designed to receive a query from a user and analyze the query to determine relevant estimates, e.g., topic or focal point, which are used in generating a DCP. As shown in FIG. 2, the DCP generation engine 160 may directly receive or process a query received either directly from a user 200 via the network 140 or forwarded from, e.g., the search engine 150 (which receives the query from a user 200 via the network 140).

The DCP generation engine 160 may also receive other information associated with a query. Examples of such associated information include user information, such as an identification of the user, cookie information that identifies the device on which the user issued the query. The associated information may also include some dynamic information such as input from the user or other information surrounding the query such as previous queries from the same user issued within a certain period of time leading up to the current query. Other examples of such dynamic information include a message from a different user directed to the user 200 (for whom the DCP is generated), social group status change, change according to live feed, etc. Such dynamic information is also received by the DCP update module 250. Details on the DCP update module 250 are discussed below with reference to FIGS. 8, 9, and 13.

The received query may or may not include any topic or focal point related information. When information about a topic and/or focal point is received, the query analyzer 210 may pass such information directly to the template generator 220 or may use that as a basis for further refinement. When there is no topic or focal point information received, the query analyzer 210 may perform an analysis of the query in light of the associated information to estimate, e.g., a topic of interest and/or a focal point of the DCP to be generated. Details related to the query analyzer 210 are discussed with reference to FIG. 3. The analysis result from the query analyzer is then forwarded to the template generator 220 to obtain a template that is suitable given the topic and/or focal point.

The template generator 220 is to obtain or produce, based on information related to topic and/or focal point, a template that is consistent with the topic and/or focal point and specifies. The template, for example, may indicate the number of pieces of information to be used to create the DCP, the sources of those pieces of information, and how those pieces of information are to be put together, i.e., the layout to compose the DCP. As seen in FIG. 2, the template generator 220 may be invoked either by the query analyzer 210 or by a request 215 received by the DCP generation engine 160 from a different party, e.g., from the search engine 150 or a manager of the DCP generation engine 160 (not shown). That is, the template generator 220 and subsequent modules such as the DCP generator 230 and the URL generator 240 may be activated in the absence of a query. Examples of such scenarios include when the DCP generation engine 160 initiates on its own procedure to generate DCPs based on some selected criteria, e.g., predetermined topics/focal points. Details associated with the template generator 220 are provided below with reference to FIGS. 4, 5(a)-5(d), and 11.

Once the template, denoted as T in FIG. 2, is obtained, it is passed to the DCP generator 230, which dynamically produces a DCP. In forwarding the template T, additional information may also be provided to the DCP generator 230. Such additional information may be a part of the associated information that the template generator 220 uses to obtain the template, including but not limited to, the user's identification, a cookie associated with the device on which the user issued the query, etc. Such additional information may also be used by the DCP generator 230 in creating the DCP. Details related to the DCP generator 230 are provided below with reference to FIGS. 5(b), 5(d), 6, 7, and 12.

After a DCP is generated by the DCP generator 230, the DCP is forwarded to both the locator generator 240 and the DCP update module 250. When the locator generator 240 receives the DCP, it generates a locator that can be subsequently used to uniquely locate and access the DCP. Such a locator may be a URL for locating the generated DCP. It should be understood by those skilled in the art, however, that although a URL is used in this disclosure to illustrate a locator for content, a DCP locator can be any other form of locator and generated based on any means known in the art presently or by any new approach designed or adopted in the future to represent identify or otherwise locate a content page so that it can be used to locate the underlying content page in order to retrieve the content associated therewith.

When the generated DCP has an associated locator, the DCP can be subsequently identified and repeatedly accessed, just like other content accessible via, e.g., the Internet. It is in that sense, the DCP is not a transitory collection of information that does not persist after a viewing session, as is a search result page that a traditional search engine can achieve. For example, when a user searches for content via a conventional search engine, what is returned from the search engine is a page that is dynamically composed using multiple pieces of information from different sources (URLs) with a simplistic layout (a listing). However, such a returned page is transitory in the sense that it can not be located or accessed in the future unless an identical search is performed. However, a DCP, generated according to the present teaching, is a stable content page because either a skeleton DCP (with URLs as place holders) or a fully rendered DCP, once generated, can be located in the future via the locator assigned to the DCP so that the DCP can be repeatedly accessed and viewed in a stable manner. This feature, regarding the stable nature of the DCP and ability to repeatedly access the DCP based on the assigned locator, is in addition to the aspect that the DCP content can be always fresh and updated.

Furthermore, even though a dynamic content page returned by a traditional search engine has multiple pieces of information, they are all related to the keywords that appeared in the query and are not really content that complement each other to support a focal point. A DCP, generated in accordance with the present teaching, has multiple pieces of content that are identified to suit a common theme or focal point. Some of the content included in a DCP may not even have many features matching key words of the query according to traditional search engines. For instance, a DCP generated based on query "whale watching in Monterey" may include an advertisement for a tennis tournament in Monterey if it is estimated that the user's query likely relates to a stay in Monterey and one of the user's hobbies is tennis.

Also, a dynamic page returned by a traditional search engine does not have any layout (other than a simple listing of all URLs). A DCP has a layout designed to reflect a focal point. Depending on a focal point, the layout of a DCP may change (see FIGS. 5(b) and 5(c)) so that even though the information contained therein is the same they are arranged differently to serve the focal point. For example, for a query "whale watching in Monterey", for a user who is a professional writer for a travel magazine, an estimated focal point may be the features related to the whale watching activity offered in Monterey (so that the map included in the DCP may be placed at a minor spot on the page). But if the user is judged likely to take a vacation in Monterey and is not a California resident, a map that is marked with different local attractions, including whale watching, may be placed at a much more noticeable location on the page.

As outlined above, the DCP generation engine may receive a request for a DCP as a query from a user or as a request for another party. Once generated, the DCP and/or its URL may then be sent to, e.g., a search engine 150 that may have requested the DCP. Such result may also be sent directly to a user who initiated the query, if the DCP generation engine 160 operates independently as a content provider.

The generated DCP and its URL are also sent to the DCP update module 250, which may then monitor relevant dynamic information via the network 140 and update the DCP whenever it is appropriate. When a DCP is being viewed by a user 200, the DCP is active and the active content contained therein (such as a chat room or a site for making reservations for whale watching) needs to be updated whenever there is dynamic information that causes a change in the active content. For instance, if the user 200 is viewing a DCP and enters some input via the DCP (e.g., making a reservation), such dynamic information is received by the DCP update module and is then used to update the DCP to reflect the input. Another example is when the user is actively participating in a live chat room included in the DCP. The updated DCP, denoted as DCP', is then sent to the user (not shown). Details related to the DCP update module 250 are discussed with reference to FIGS. 8, 9, and 13.

Figure 3:
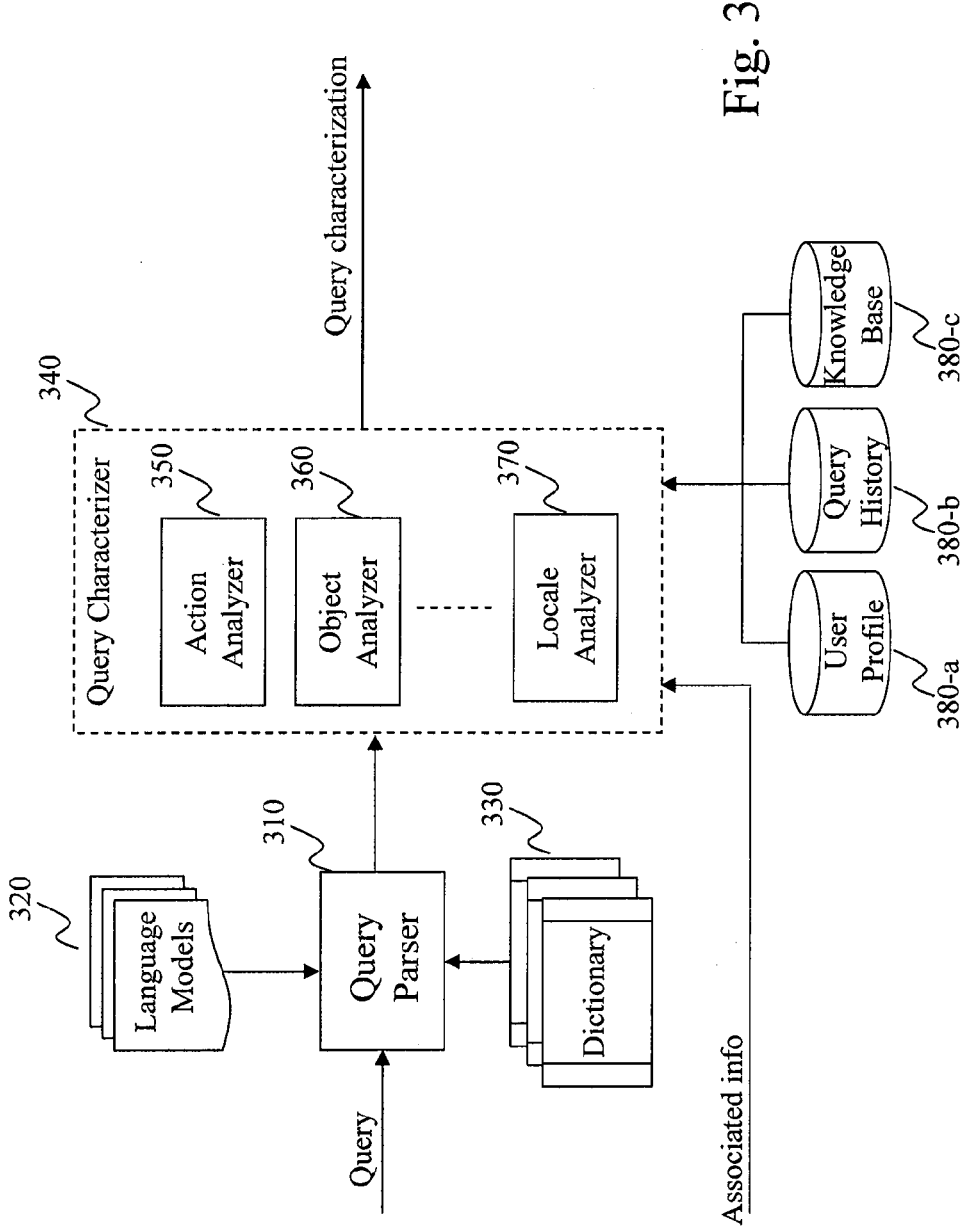
FIG. 3 is block diagram of an exemplary query analyzer.

FIG. 3 is an exemplary block diagram of the query analyzer 210, according to an embodiment of the present teaching. The exemplary query analyzer 210 includes a query parser 310, which takes a query as an input and produces parsed information to a query characterizer 340, which then generates a characterization of the query based on various types of information. Although a query usually has only keywords rather than sentences, parsing is often necessary to ascertain the relationship among given words of a query. For example, if a query is "whale watching in Monterey", parsing the query may provide useful information to determine relevant concepts contained in the query, such as "action", "what", "where", etc. Such concepts may be used to assist in estimating the focus or focal point when combined with other types of information. In parsing a query, the query parser 310 utilizes language models 320 and dictionaries 330. The parsed query is then passed to the query characterizer 340, in which detailed analysis may be performed to generate a characterization of the query.

To obtain a characterization of a query, the query may be analyzed from different perspectives. For example, an action analyzer 350 may be used to determine the action requested in the query and the type of action (e.g., sports, art, or others). An object analyzer 360 may also be used to determine the object to be involved in the action. For instance, "whale" may be an object in the action "watching". In some situations, a determination of one aspect of the query may depend on how another aspect is analyzed. For instance, "watching" itself does not tell whether it is an indoor or outdoor activity. It is only when the object is "whale", it can be determined that it is likely an outdoor activity. The query characterizer 340 may also include a locale analyzer 370, which may be used to ascertain what kind of locale information is provided in a query. For instance, "Monterey" can be either the name of a city or a restaurant. When there is ambiguity, the analysis on other words such as "whale watching" or general knowledge retrieved from, e.g., knowledge base 380-c, that the city Monterey does offer whale watching, may be used to determine the meaning of query words. So, different analyses by different analyzers may be exchanged to improve the quality of the characterization. In analyzing different aspects of a query, information associated with, e.g., the user such as demographics, hobbies, past activities, query histories, or general knowledge such as that whale watching is generally an outdoor activity, may all be used.

Figure 4:
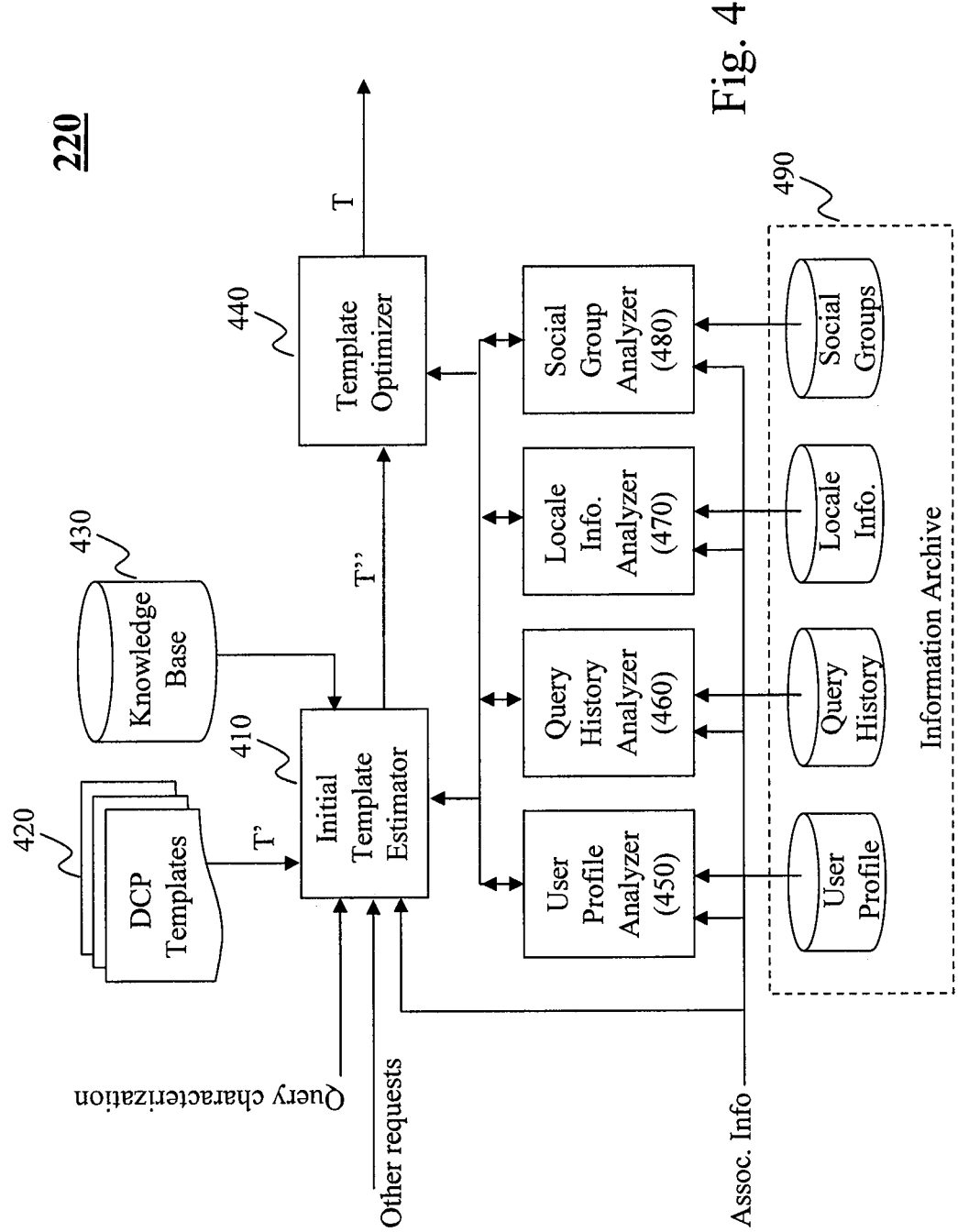
FIG. 4 is a block diagram of an exemplary template generator.

FIG. 4 is an exemplary block diagram of the template generator 220, according to an embodiment of the present teaching. The exemplary template generator 220 includes an initial template estimator 410 and a template optimizer 440. The initial template estimator 410 may obtain an initial template. Depending on the operation mode of the DCP generation engine 160, the initial template estimator 410 may function differently. In some embodiments, the input to the initial template generator 410 is a characterization of a query. In some embodiments, the request to generate a template may be received from another party and the request may specify a topic estimated based on a query. In the former situation, the initial template generator 410 may function to estimate the topic of the query based on the characterization of the query. In the latter case, the initial template generator 410 may simply take the input topic as input and obtain a template consistent with the given topic.

To obtain a template appropriate with respect to a characterization of a query, the initial template estimator may invoke different analyzers to analyze information from different sources. Each analyzer may assist the initial template estimator 410 to obtain some information with respect to some aspects of the underlying topic or focal point. For example, a user profile analyzer 450 may be provided to analyze the profile of a user, stored in a user profile database in an information archive 490. The analysis result with respect to a user's profile may help to determine the topic or focal point of the template. Based on a user profile, the user profile analyzer 450 may determine that the user has a hobby of tennis playing or travel.

A query history analyzer 460 may also be provided to analyze query histories of either the user or others to provide information to assist the initial template estimator 410 to ascertain the meaning or intent of the query. When invoked, the query history analyzer 460 may examine both the query history of the user and that of others, stored in a query history database in the information archive 490, to understand, e.g., the context of the current query or the likely topic associated with the present query. For instance, if the user of a current query just had a number of other queries for purchasing airline tickets to California, such information may be singled out by the query history analyzer 460 and it may be estimated that the current query for "whale watching" is associated with a desired activity during a vacation (e.g., the user profile may indicate that the user is not a resident of California). Such an estimation may provide important information to the initial template estimator 410 in determining what content is to be included in the underlying DCP.

The initial template estimator 410 may also invoke a locale information analyzer 470 to analyze information related to a locale for different purposes. For instance, if a query specifies "whale watching in Monterey" and the prior analysis performed, e.g., by the profile analyzer 450 and/or the query history analyzer 460, indicated that the user is likely planning a vacation in Monterey, the initial template estimator 410 may invoke the locale information analyzer 470 to see whether there are other activities offered in the same locale that may fit the user's profile so that such content may be included in the DCP. Locale offerings may be identified based on a locale information database in the information archive 490. Alternatively, the locale information analyzer 470 may also be invoked to check whether a desired action to be carried out is actually offered by that locale. The result of such an analysis may be used to disambiguate the meaning of a word in a query, e.g., whether "Monterey" corresponds to a name of a geographical area or something else.

In addition, the initial template estimator 410 may also invoke a social group analyzer 480 to check, e.g., whether the user is a member of any social group based on information stored in a social group database in the information archive 490 and if so, whether any member of the same social group resides in the specified locale. If so, the initial template estimator may further request the locale information analyzer 470 to find out whether there is any event(s) associated with such social group(s) that will be held in the locale in a specified period. There may be other analyzers that the template estimator 410 may invoke, depending on the situation (not shown). Results returned from those analyzers (e.g., 450-480) may then be used by the initial template estimator 410 in obtaining a template that is consistent with the focus or topic of the query.

With different analysis results received from the analyzers 450-480, the initial template estimator 410 may obtain an initial template in different ways. For example, it may be retrieved from a storage 420 where various templates for DCPs are stored, if a stored template satisfies the topic and/or focal point of the current query. Each stored template may be associated with some topic and/or focal point and some other features. Such stored templates may be previously created either by a human editor or by a computer (not shown) based on some topic or focal point of a previous query. Such stored templates may be categorized for indexing and searching purposes. The categorization may be at multiple levels, each of which may or may not be based on topics. For instance, templates may be classified first based on the structure of a query, e.g., "action in a locale", "event in the past", etc. Then in each of such categories, e.g., "action in a locale", it may be further classified based on the nature of the action such as "sports", "entertainment", "health", "education", etc. For instance, for an action related to education such as applying for admission to college, a template may be stored with a layout that does not include an area for weather forecast information. For an action related to sports such as a tennis tournament, a template stored may have a different layout including weather forecast information.

Alternatively, when no appropriate existing template can be identified from storage 420, the initial template estimator 410 may create one based on a topic and/or a focal point. Such a created template may be created based on a variety of information provided by those analyzers 450-480 and some topic estimated based on the information. In generating a template, various rules or heuristics, stored in a knowledge base 430 may be used. The initial template, denoted as T" in FIG. 4, is sent to the template optimizer 440, which refines the template. The refinement may be based on a more detailed analysis of various types of information in a manner as disclosed herein, in light of other information provided by analyzers 450-480.

FIGS. 5(a)-5(d) show different exemplary templates and corresponding DCPs created based on the templates, according to different embodiments of the present teaching. In FIG.

5(a), a template 500 is illustrated with a layout with different sub-areas configured in a certain way. Each of the sub-area is specified to correspond to some specific content with an indication as to the source of the content, e.g., URLs (not shown). As an illustration, the template 500 includes 7 sub-areas. The top sub-area 510 is for a page heading, which may indicate the source of the DCP and the query that triggered the generation of the DCP. In this illustrated embodiment, the heading indicates that the DCP page is from Yahoo! and the query that leads to this DCP is "whale watching in Monterey". This sub-area may also include other information or selectable icons such as what one would normally see on the page of the DCP creator, Yahoo! in this example.

Sub-area 520 is an area where the topic content is to be placed. For example, for the query "whale watching in Monterey", the topic content may relate to an article describing the whale watching offered in Monterey. Sub-area 530 may correspond to topic activity, which can be other reported activities that are going on in the locale specified. Similarly, sub-area 540 is intended for topics and messages containing a specified "action", e.g., whale watching. Sub-area 550 is for showing a map of the locale which shows the geographical location where the requested activity will be. Sub-area 560 is for various commercial related content such as advertisements or shops identified as related to the topic of the DCP. The display of the commercials may also be specified (not shown). For instance, if it is detected that there are quite a few commercials available but there is only limited space, the area for such commercials may rotate such content or show such content in a rolling basis. Sub-area 570 as illustrated is for live social group activities in the specified locale.

Figure 5A:
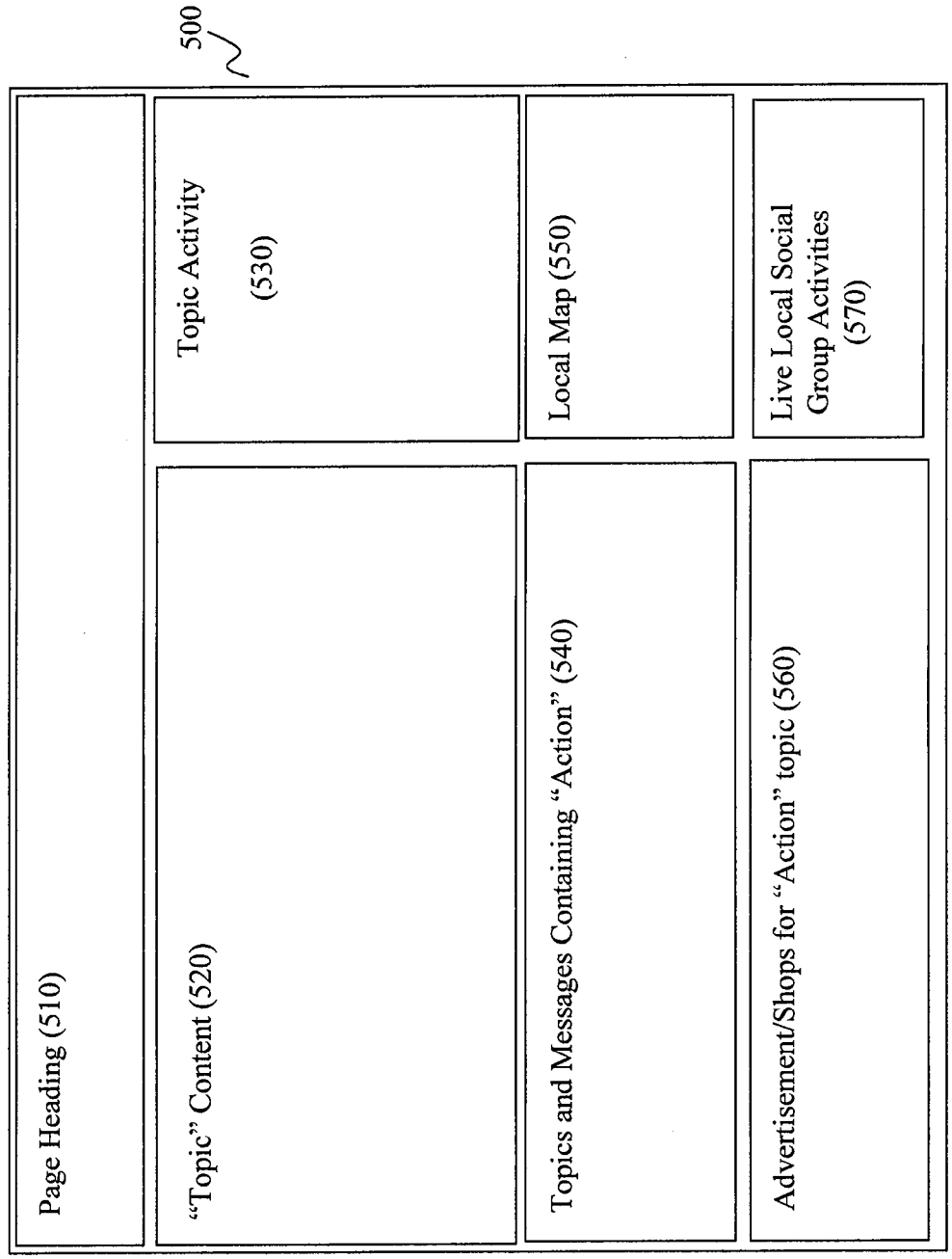
Figure 5B:
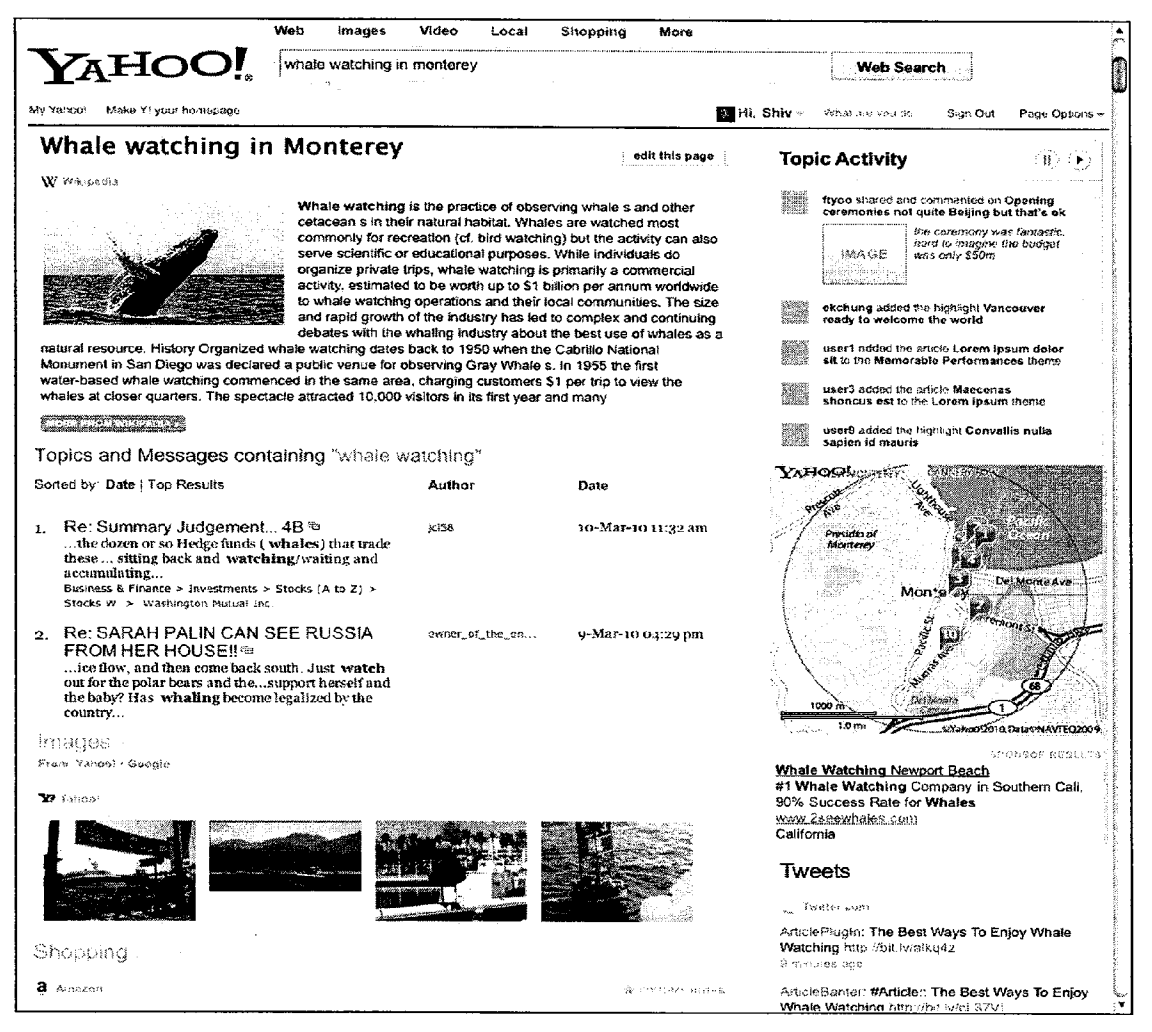
Figure 5C:
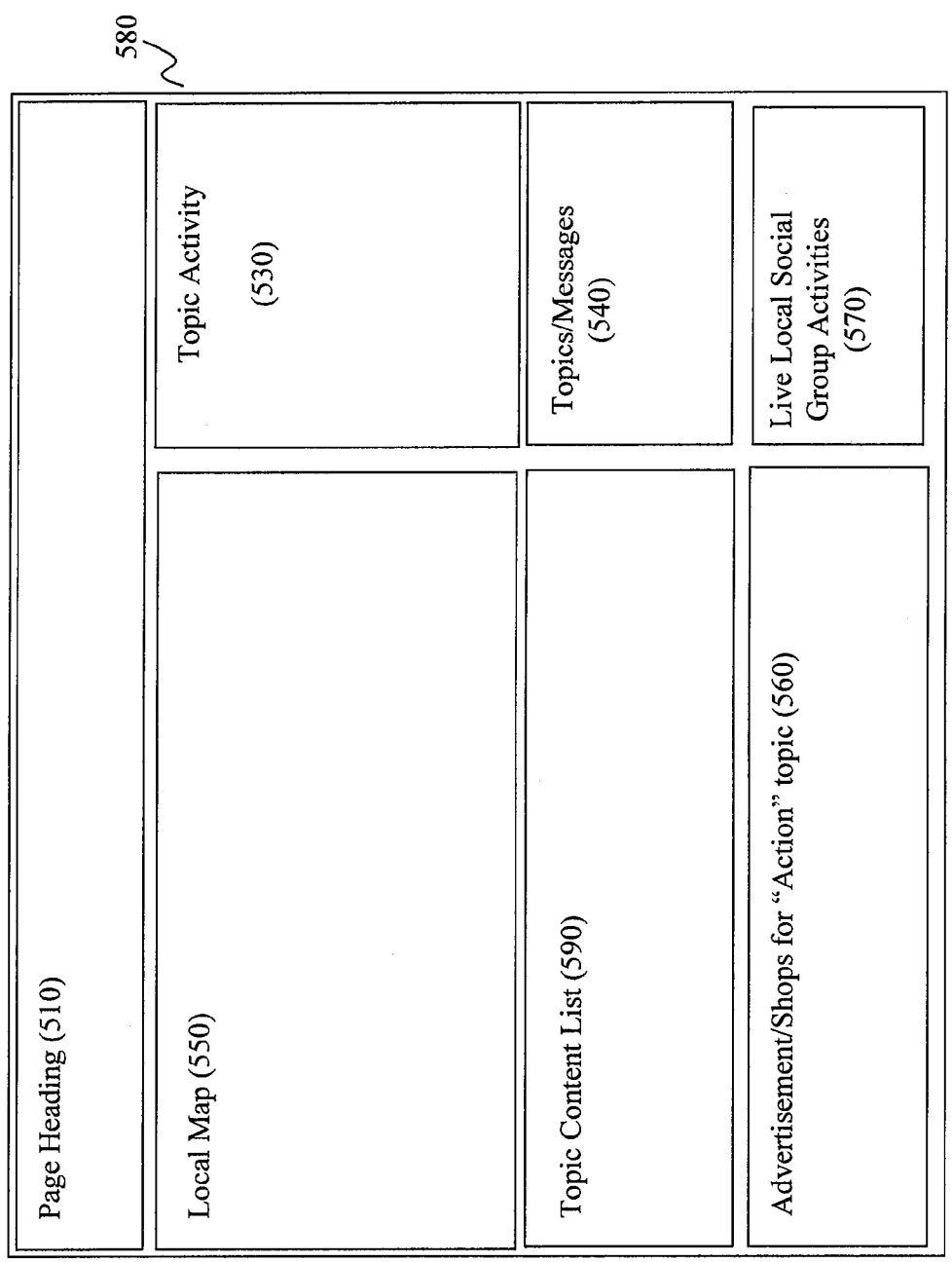
Figure 5D:
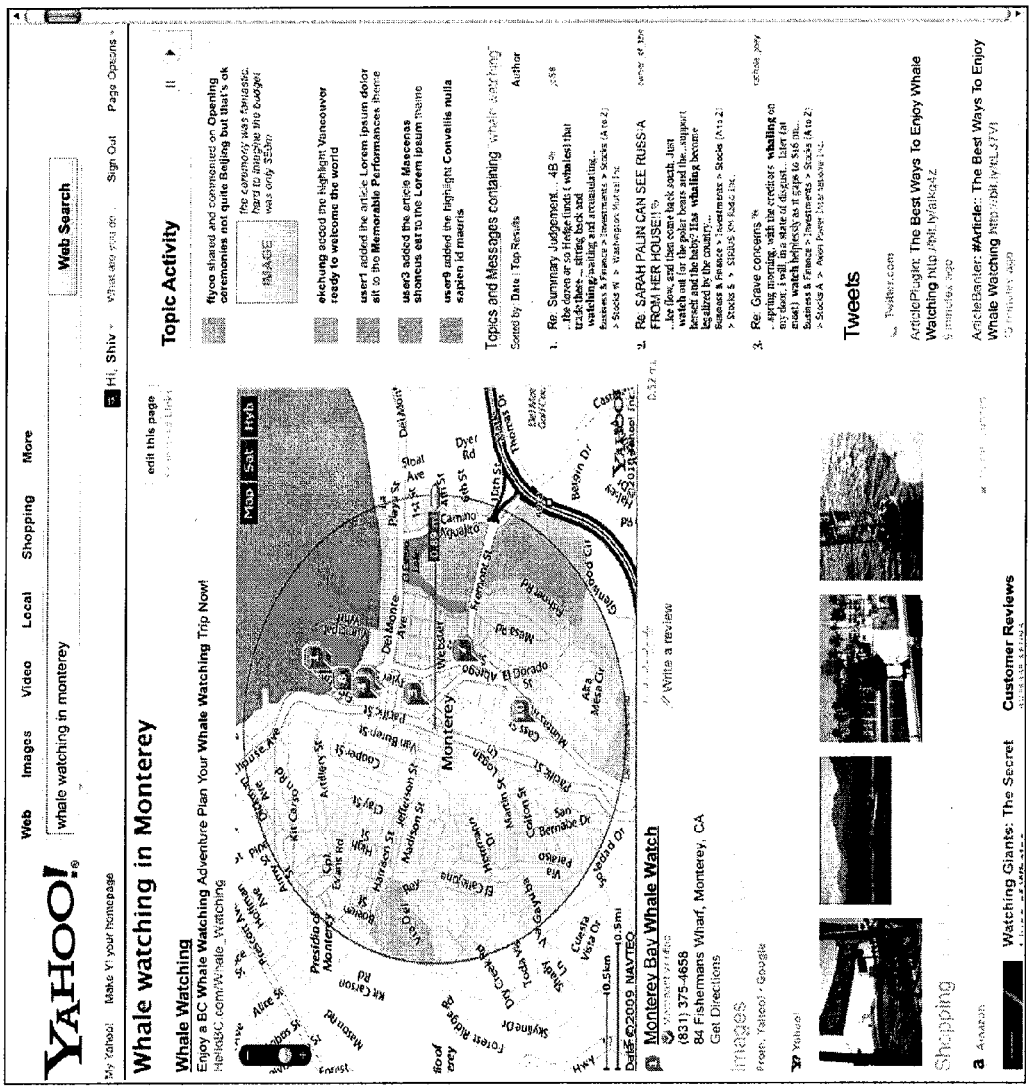

The focal point for template 500 is reflected in the layout in which the central content is the topic content 520. This focal point may be estimated based on a conclusion that the user who issued the query is seeking information related to whale watching in Monterey. A rendering of template 500 is shown in FIG. 5(b). FIG. 5(c) shows a template 580 which, although with a similar template structure, has a slightly different layout and content included when the estimated focal point in this case differs from what is shown in FIG. 5(a). In this illustration, the focal point is that the user who issued the query is seeking information as to the location of the whale watching in Monterey. With that shifted focal point, the local map 550 is now displayed in the center of the page and the topic content 520 in FIG. 5(a) is now merged with topic content list 590 and is listed as one of the selectable URLs. A fully rendered page based on template 580 is shown in FIG. 5(d).

Figure 6:
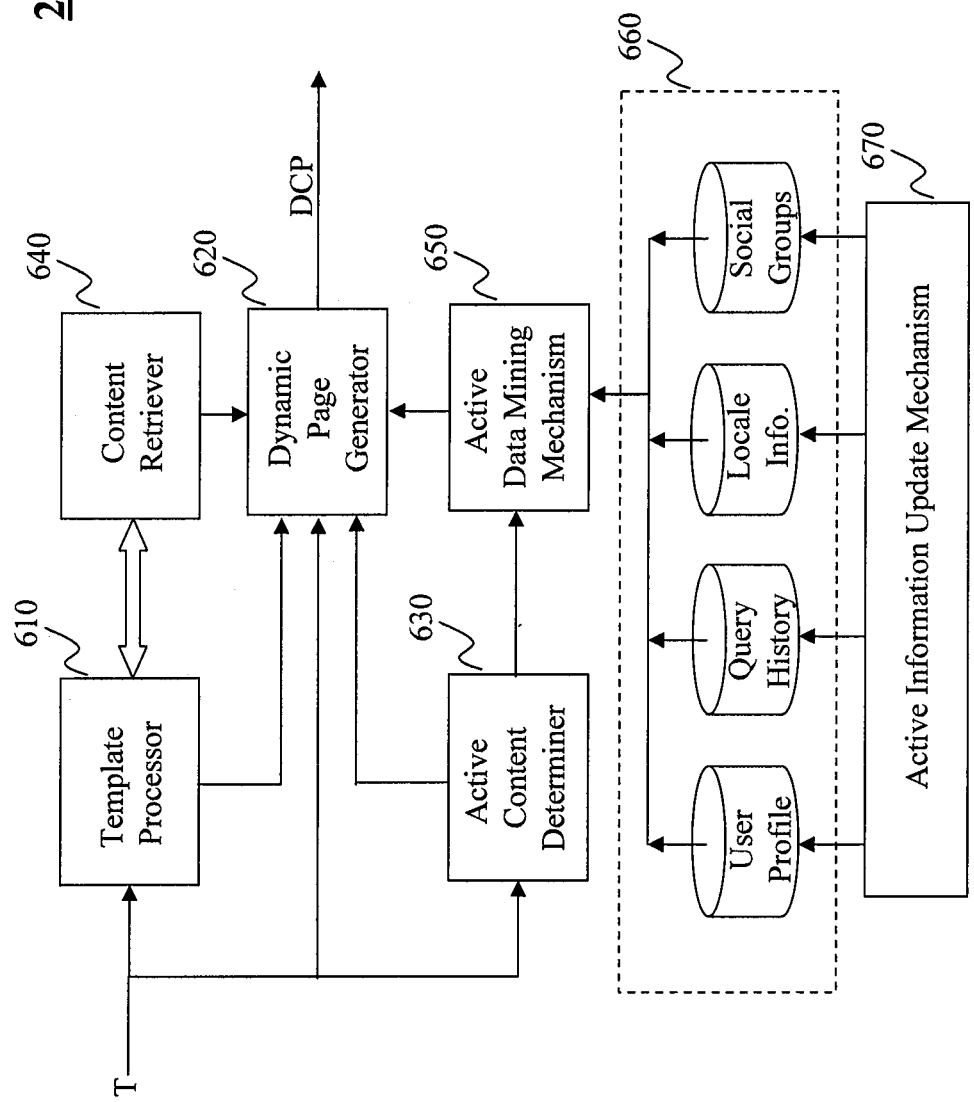
FIG. 6 depicts an exemplary DCP generator, in block diagram form.

Once a template is generated, a DCP can be generated in accordance with the template. FIG. 6 shows an exemplary block diagram of the DCP generator 230, according to an embodiment of the present teaching. The DCP generator 230 includes a template processor 610, an active content determiner 630, a content retriever 640, an active data mining mechanism 650, and a dynamic page generator 620. When a template T is received by the DCP generator 230, the template processor 610 and the active content determiner 630 analyze the template and according to the specification of the template, obtain different pieces of the content to be included in the DCP. For example, for any piece of static content that can be located via a locator, the template processor 610 may forward such locator to the content retriever 640, which then accesses the content via the locator and returns the content to the dynamic page generator 620. Examples of such a static piece of content include the topic content in FIG. 5(b) that corresponds to an article entitled "Whale Watching in Monterey" or the map of Monterey shown in FIG. 5(d). As discussed herein, by "static", it does not necessarily mean that the page is not interactive. For example, a viewer may interact with the map shown in FIG. 5(d) by zooming in and out and even clicking on a dot representing a tourist attraction to jump to a web page for that attraction. Such content is static in the sense that unless further input is received from the user, the content as shown may not change.

In contrast, the active content included in a DCP is active in the sense that it is frequently updated based on the dynamics detected in the network, regardless of whether the user provides an input or not. For example, FIGS. 5(b) and 5(d) both include a sub-area where content entitled "Tweets" is displayed. The content shown in this sub-area is likely constantly updated. Another example of active content is a blogging site (not shown) which may also be updated whenever there is an entry from either the user or some other participants of the blog site. The active content determiner 630 identifies the sub-areas specified by the template T for active content and sends such information to the active data mining mechanism 650.

The function of the active data mining mechanism 650 is to track the active content and identify the active information that is relevant to a given DCP. The active data mining mechanism 650 may perform its function based on various active information sources in the information archive 660, which may be constantly updated by an active information update mechanism 670. As shown later in FIG. 8, there may be various sensors distributed in the network that keep track of, e.g., who is where and when, who is connected to whom at any moment, who is involved in which online conversation and when, what information is sent from who to whom, or anything else that is related to the configuration of users on the network and the information flow patterns. Such sensors feed information to some network tracking engine which may then populate various databases such as the ones shown in 660 through, e.g., the active information update mechanism 670.

The static and active content retrieved in accordance with the template T are then forwarded, from the content retriever 640 and the active data mining mechanism 650, to the dynamic page generator 620. The dynamic page generator 620 then arranges all the received content pieces in a DCP in accordance with the layout specified by template T. Such created DCP is then output, e.g., to the URL generator 240 so that a locator can be generated for the DCP. The locator may be created based on any method presently known in the art or any future methods. For example, a URL may be created for each DCP generated to include, e.g., text that is considered to be highly relevant to the topic or focal point of the DCP so that the URL is optimized to maximize the hit rate of the DCP in subsequent searches by a search engine.

In some embodiments, the dynamic page generator 620 may not render a DCP until a user selects to view the DCP. In this case, what is generated by the dynamic page generator 620 may be a skeleton DCP which includes merely URLs representing the sources of pieces of content to be included in the DCP. That is, in this case, the DCP generation engine 160 does not store in its storage any copy of the pieces of content used to compose the DCP. Such a skeleton DCP is not rendered to an actual content page until a user desires to view the DCP page. At that time, the DCP is rendered on the fly and different pieces of content from different sources are then accessed via the stored locators and rendered in designated sub-areas specified by the template. In this case, the copies of pieces of content accessed from different sources are held by the DCP generation engine 160 in a transitory sense and are not saved.

In some embodiments, the multiple pieces of content to be included in a DCP may be from a single source, e.g., a content provider such as Yahoo!. In this case, if the DCP generation engine 160 has permission to use content from the source, the dynamic page generator 620 may render the DCP before it is accessed and stores a copy of the DCP for future accesses (the active content may still have to be rendered on the fly when the DCP is accessed). This may include the situation in which the single content source is the DCP generation engine 160, which may be a content provider and at the same time, it may bootstrap from its content reserves to create more content such as DCPs that integrate existing content in a meaningful way at, e.g., a topic centric level.

Figure 7:
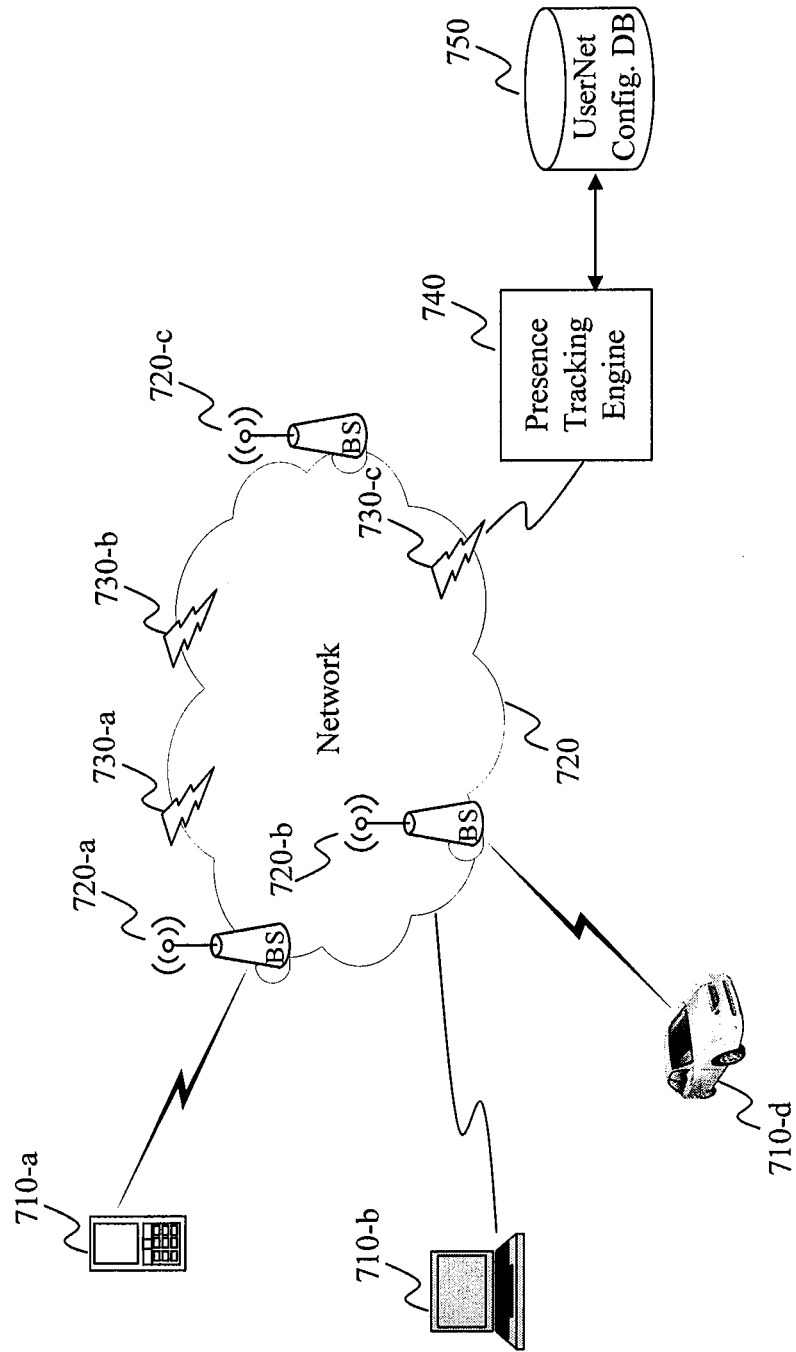
FIG. 7 depicts an exemplary system architecture for collecting and tracking information related to user presence and spatial configurations.

FIG. 7 is an exemplary system architecture 700 for collecting and tracking information related to user presence and spatial configurations, according to an embodiment of the present teaching. A network 720 in FIG. 7 connects many users, e.g., 710-*a*, 710-*b*, . . . , 710-*c*, at any moment and such connections are changing constantly. For example, users connected via a local wireless network may phase in and out due to the physical distance in between. A configuration of the network in terms of how users are connected is relevant to this disclosure because it may affect the active content to be displayed on a DCP. To keep track of such a dynamic configuration, various sensors such as 730-*a*, 730-*b*, . . . , 730-*c* may be distributed in the network that can sense the presence of users. Such sensors may be stand alone devices or implemented in other network devices such as a router, a gateway, or a base station such as 720-*a*, 720-*b*, . . . , 720-*c*. In addition, a presence tracking engine 740 may be deployed in the network to collect information from various sensors and dynamically update information related to user network configuration stored in a database 750. The presence tracking engine 740 may be centralized or distributed. The UserNet Configuration database 750 may also be either centralized or distributed.

Figure 8:
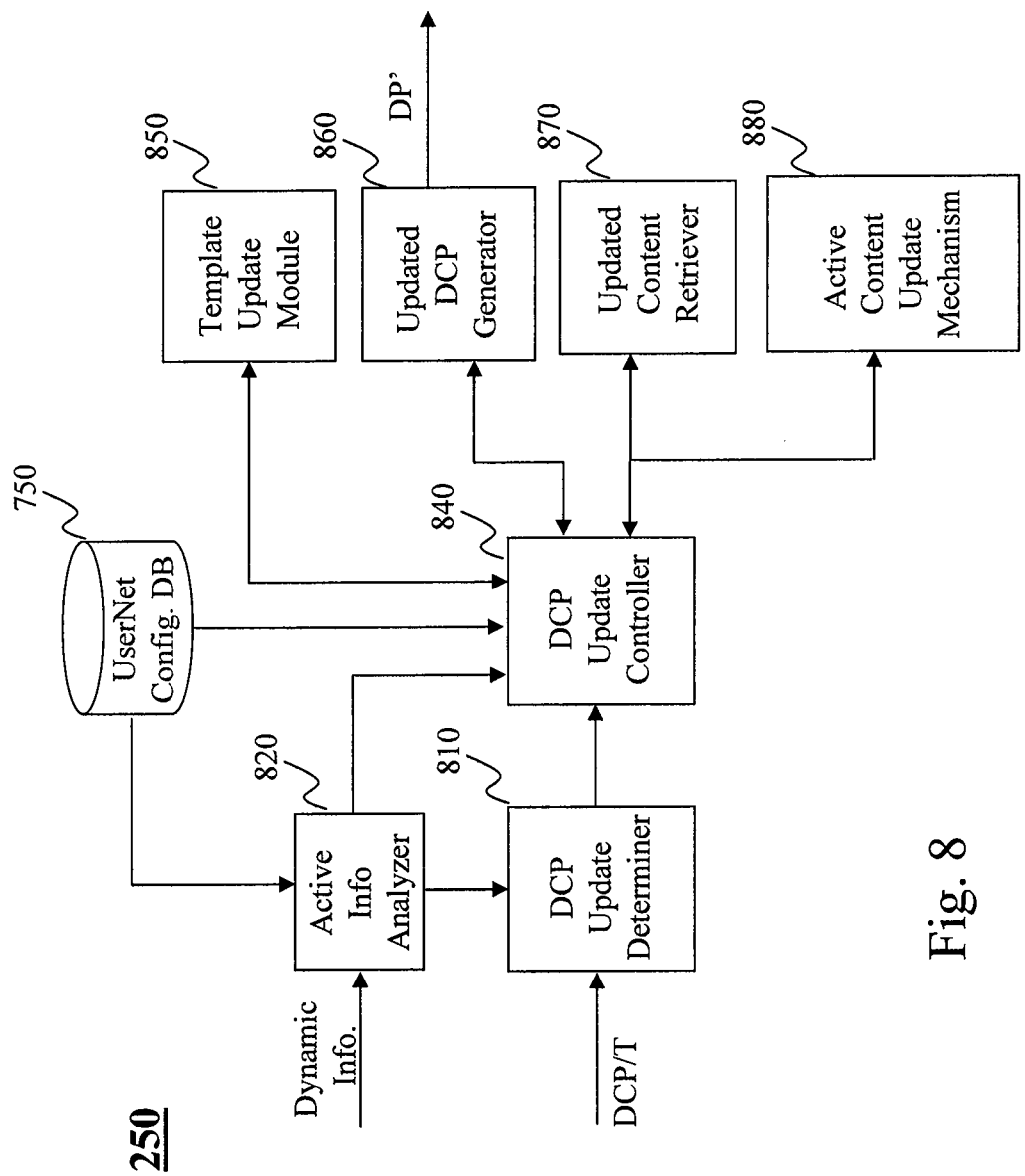
FIG. 8 depicts an exemplary DCP update module, in block diagram form.

FIG. 8 is an exemplary block diagram of the DCP update module 250, according to an embodiment of the present teaching. In this exemplary diagram, the DCP update module 250 includes a DCP update determiner 810, an active information analyzer 820, and an update controller 840. In addition, the DCP update module 250 may also include a template update module 850, an updated DCP generator 860, an updated content retriever 870, and an active content update mechanism 880. The active information analyzer 820 takes dynamic information as input and analyzes such received information. Dynamic information includes input from a user viewing the DCP, content update from social networks, a live feed, etc. The active information analyzer 820 may also access information stored in the UserNet Configuration database 750 such as which user is connected and which one has been disconnected. Such dynamic user configuration information may then be forwarded to the DCP update determiner 810.

The DCP update determiner 810 determines whether an update to a DCP is warranted. For example, if a DCP is composed of only static content and there is no input from the user viewing the DCP, an update may not be needed. On the other hand, if a DCP contains active content or there is a user input after viewing the DCP, an update may be needed. The DCP update determiner 810 takes input from the active information analyzer 820 or other information (not shown) and makes a determination as to whether to proceed with an update to a given DCP.

When an update is needed, the DCP update determiner 810 may invoked the DCP update controller 840, which may determine the strategy to carry out the update and control the process of generating an updated DCP. In some situations, the update needed may require a new template. In this case, the DCP update controller 840 may invoke the template update module 850 with information needed to update the underlying template that governs the DCP to be updated. For example, if the active information analyzer 820 informs the DCP update controller 840 that inputs from the user viewing the DCP may indicate that the focal point of the template estimated previously is not consistent with the recent inputs from the user, the DCP update controller 840 may proceed with updating the template first by invoking the template update module 850. The template update module may function in a similar manner as a template generator but with additional information such as the existing topic, the previously estimated focal point, and importantly the user's inputs which triggered the update to the template. Such additional information may be used to assist the template update module to produce an update template with, e.g., an enhanced focal point and, thus, the content to be included in the updated DCP and possibly the layout. The updated template is then returned to the DCP update controller 840 and used to create the updated DCP.

In generating an updated DCP, the DCP update controller 840 may invoke the updated content retriever 870 to retrieve, via locator(s) specified in a template (either the original one or an updated one), one or more pieces of updated content. If the template is an updated template, some of the content retrieved may correspond to new content. The DCP update controller 840 may also invoke the active content update mechanism 880 if there is any active content to be updated. When the DCP update controller 840 receives the updated version of content that needs to be updated in the DCP, the DCP update controller 840 may then invoke the updated DCP generator 860 to generate an updated DCP. A template may be forwarded to the updated DCP generator so that different pieces of content can be arranged in accordance with the template.

Figure 9:
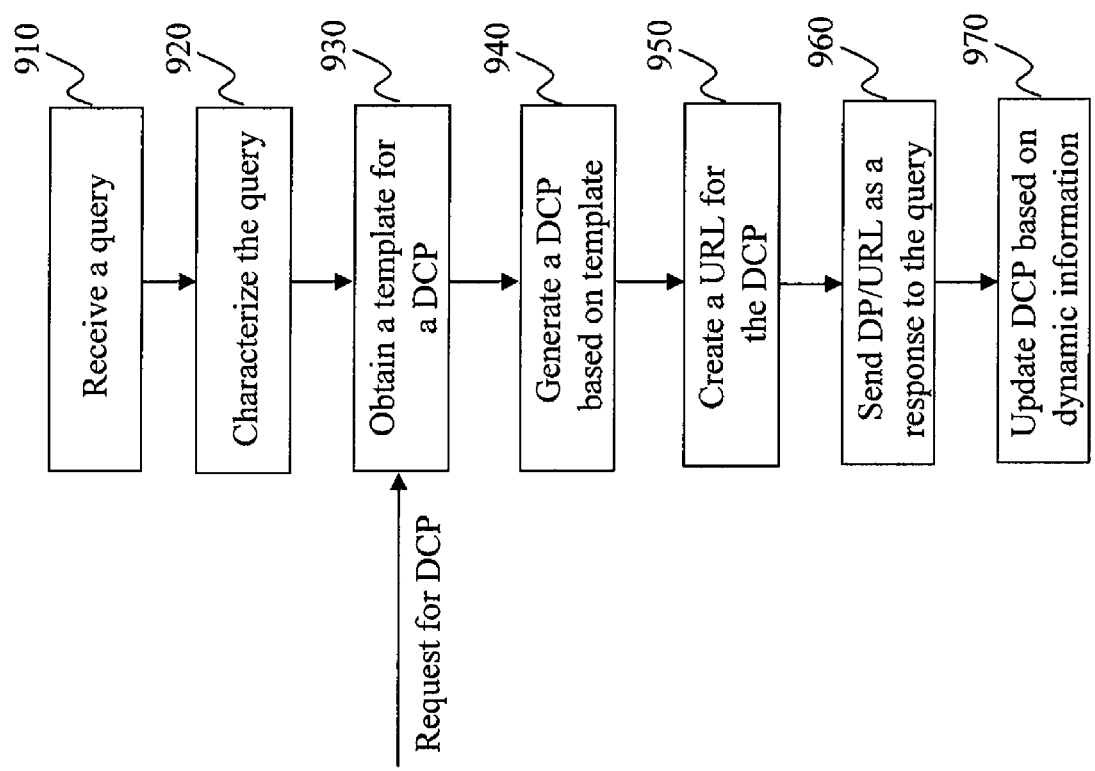
FIG. 9 is a flowchart of an exemplary process for a DCP generation engine, in which a DCP is created.

FIG. 9 is a flowchart of an exemplary process for the DCP generation engine 160, in which a DCP is created, according to an embodiment of the present teaching. In some embodiments, a query is first received, at 910, from a user. Such a query can be received directly from a user or via a search engine. The received query is then analyzed, e.g., by the query analyzer 210, and characterized at 920. Such a characterization of the query as well as other information such as the query and information related to the user who issued the query may then be used to obtain, at 930, a template with a topic and/or focal point for creating a DCP. In some embodiments, the DCP generation engine 160 may also receive a request for generating a DCP without an input related to a query. A detailed process to obtain a template is provided with reference to FIG. 10.

With the obtained template, the DCP generation engine 160 then generates, at 940, a DCP in accordance with the template. A detailed process to generate a DCP based on a template is provided with reference to FIG. 11. When the requested DCP is generated, a locator such as a URL is also created, at 950, for the DCP. Such created locator is then indexed (not shown) for future access to the DCP and necessary processing is performed to ensure that the locator is visible to search engines. The created DCP as well as the locator may then be sent, at 960, to a party that requests the DCP as a response to the request. As discussed herein, if the party requesting the DCP is a search engine, the URL is returned to the search engine. If the party requesting the DCP is an end user, the DCP is rendered and the rendered DCP is returned to the user as a response to the request. If the party requesting the DCP is a content provider, the DCP and its URL are returned to the content provider. After the DCP is created, the DCP is updated, at 970, so that the DCP is always most updated and live. A detailed process for updating a DCP is provided with reference to FIG. 12.

Figure 10:
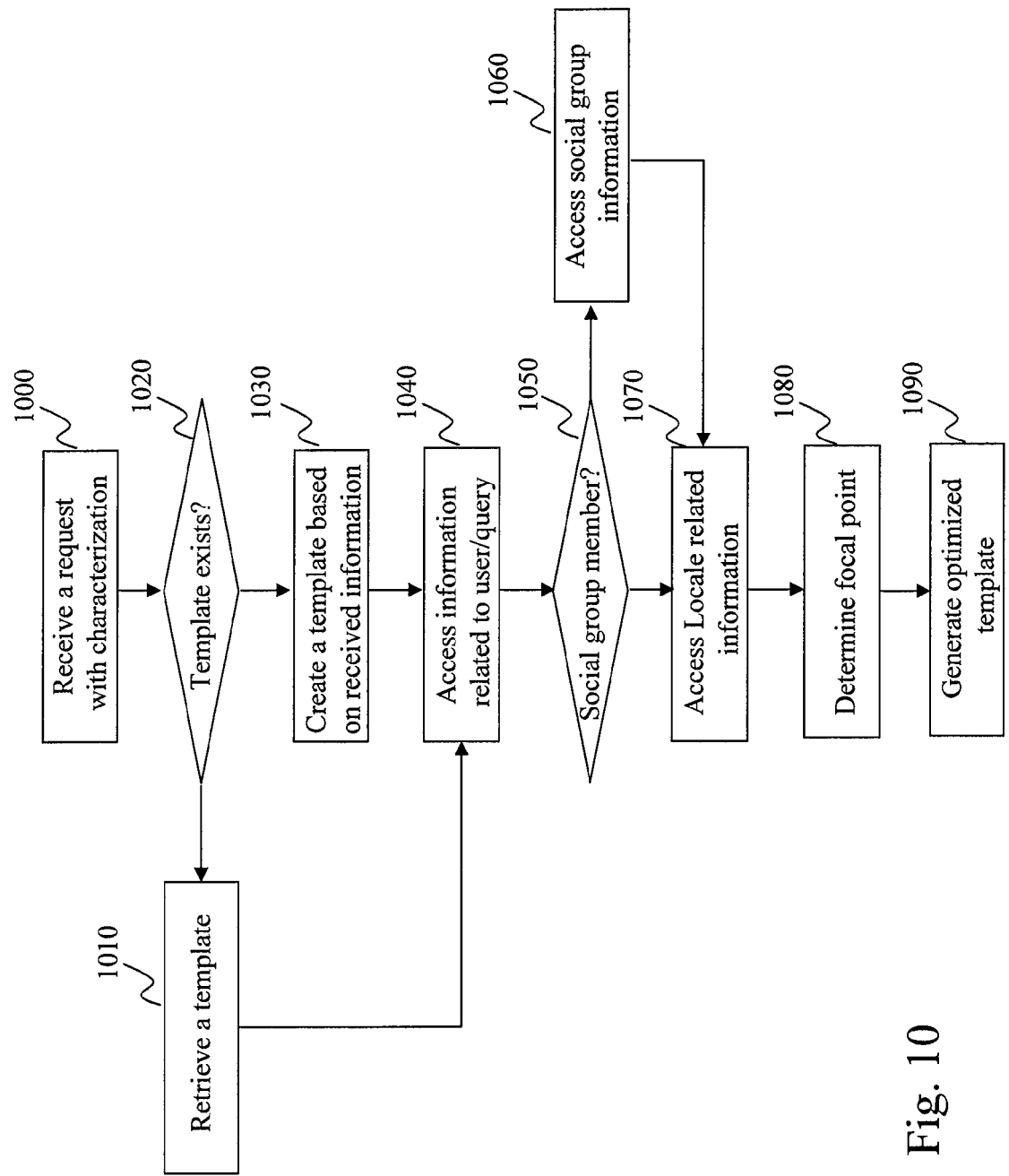
FIG. 10 is a flowchart of an exemplary process in which a template is obtained for generating a DCP.

FIG. 10 is a flowchart of an exemplary process in which a template is obtained for generating a DCP, according to an embodiment of the present teaching. A request for obtaining a template is first received, at 1000. As discussed herein, the request may be from the query analyzer 210 of the DCP generation engine 160 or may be from another party such as a search engine. The request may include information related to or useful for obtaining the template. Such information includes, e.g., a user identification, a cookie, a topic and/or a focal point estimated based on a query. Based on the received information, the template generator may check, at 1020, whether a pre-stored template exists that is consistent with the request. If such a pre-stored template is available, the pre-stored template is retrieved, at 1010, from a storage. If such a pre-stored template is not available, an initial new template is created, at 1030. Such an initial template may be further refined as described herein.

To refine an initial template, various information may be accessed at 1040-1070, e.g., user information such as a user's profile, query related information such as query history of the user and/or others', social group information such as a user's membership in any social groups, presence of the social group in a relevant locale, and/or locale information such as activities/events offered by a locale. With a variety of information, a refined focal point may be determined at 1080 based on which the template may be optimized at 1090.

Figure 11:
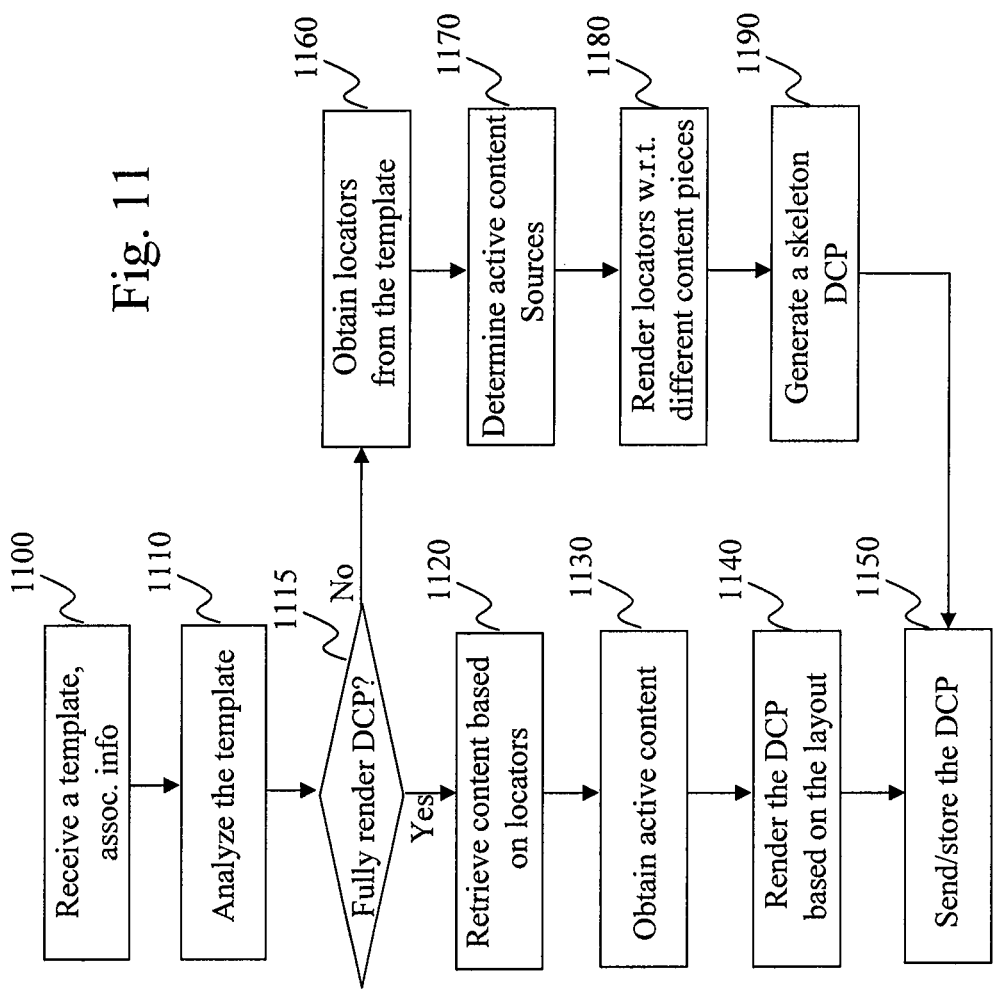
FIG. 11 is a flowchart of an exemplary process in which the DCP generator creates a DCP based on a template.

FIG. 11 is a flowchart of an exemplary process in which the DCP generator 230 creates a DCP based on a template, according to an embodiment of the present teaching. A template and associated information for generating a DCP are received, at 1100, and analyzed, at 1110. To determine how to render the DCP, it is determined, at 1115, whether the DCP is to be fully rendered. If the DCP is to be fully rendered, different pieces of content to be included in the DCP, as specified by the template, are retrieved from designated source(s) at 1120. Active content to be included in the DCP is also obtained, at 1130, from appropriate sources. The DCP is then rendered, at 1140, in accordance with the layout specified by the template. The rendered DCP is then sent or stored at 1150.

If the DCP is not to be fully rendered, a skeleton DCP is rendered. To do so, locators associated with different pieces of content to be included in the DCP are first obtained, at 1160, from, e.g., the template. The sources from where active content can be obtained are also determined at 1170. The locators and/or sources for the DCP are then rendered, at 1180, in a layout in accordance with the template. A skeleton DCP is then rendered at 1190. Such a skeleton DCP is then sent or stored at 1150.

Figure 12:
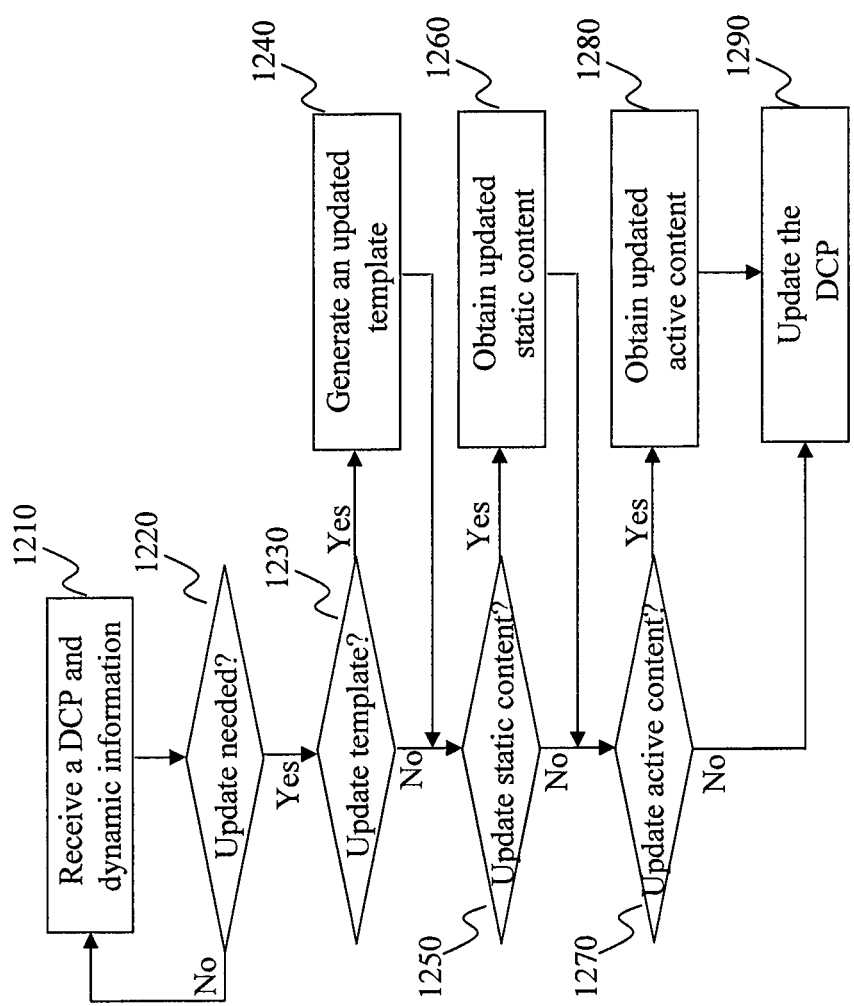
FIG. 12 is a flowchart of an exemplary process in which the DCP update module dynamically updates a DCP.

FIG. 12 is a flowchart of an exemplary process in which the DCP update module 250 dynamically updates a DCP, according to an embodiment of the present teaching. A DCP and dynamic information are first received at 1210. Based on the dynamic information received, it is determined, at 1220, whether an update is needed for the DCP. If it is determined that no update is needed, the process goes back to 1210 until it receives another DCP. If an update is needed, it is determined, at 1230, whether the template for the DCP needs to be updated. If the template needs to be updated, the updated template is generated at 1240. If the template does not need to be updated or after the updated template has been generated, it is determined, at 1250, whether any piece of static content needs to be updated. If any piece of static content is to be updated, the updated static content is obtained at 1260. If no static content is to be updated or after the updated static content has been obtained, it is determined, at 1270, whether any active content needs to be updated. If any active content needs to be updated, the updated active content is obtained at 1280. After all the updated content has been obtained, the DCP is updated at 1290.

Figure 13:
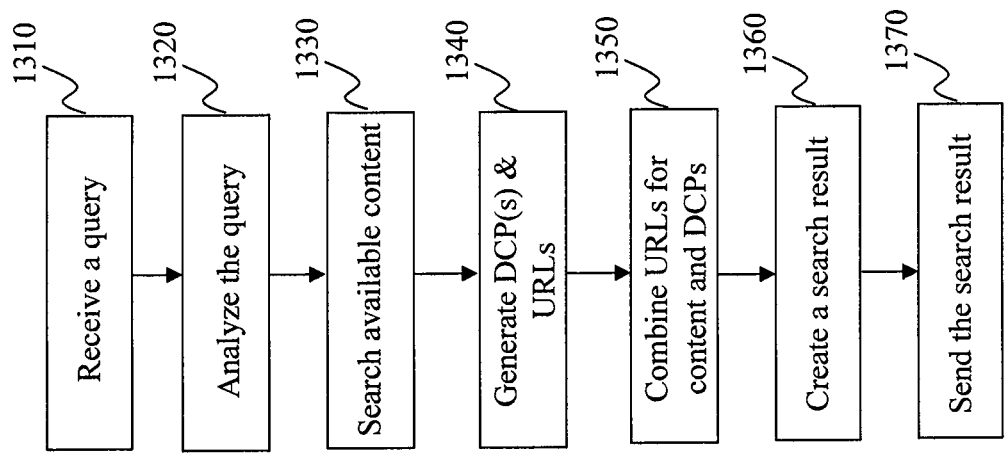
FIG. 13 is a flowchart of an exemplary process of a search engine.

FIG. 13 is a flowchart of an exemplary process of a search engine, according to an embodiment of the present teaching. A query is first received at 1310. The received query is analyzed at 1320. Such analysis may result in an estimated topic which can then be used in searching content available on the Internet that is consistent with the query. In addition to searching for available content, the search engine may also create, at 1340, DCPs in accordance with the present teaching as described herein and URLs for such created DCPs. Both the URLs for the searched content and that for the created DCPs are combined at 1350, to generate, at 1360, a search result. The search result is then sent, at 1370, as a response to the query.

As discussed herein, there may be other modes of operation in which the present teaching is applied to create DCPs which can then be used by another party, such as a search engine, as content to be provided to users when needed.

Computer hardware platforms may be used as the hardware platform(s) for one or more of the elements described herein (e.g., the query analyzer, the template generator, the DCP generator, or the DCP update module). The hardware elements, operating systems and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
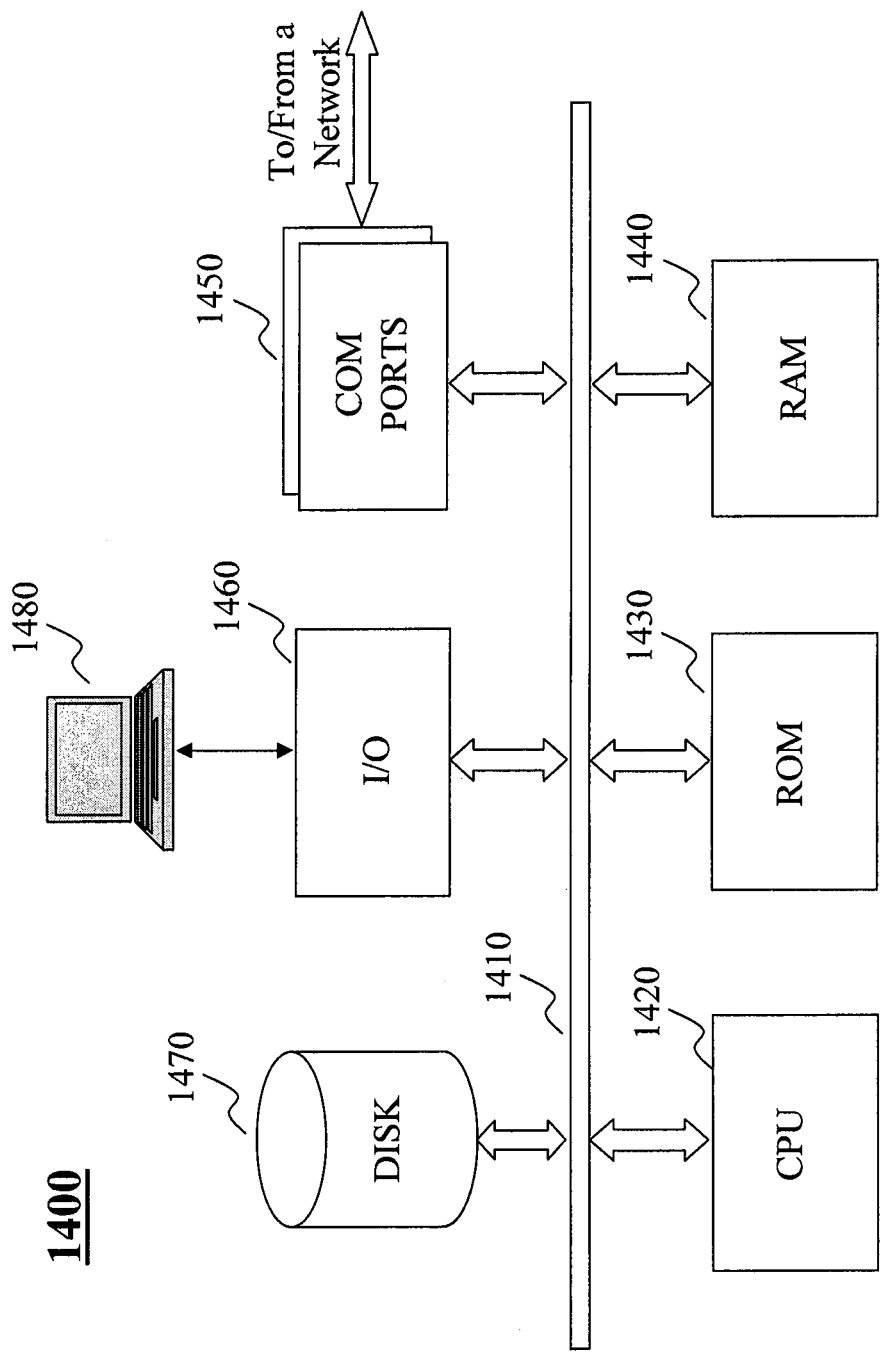
FIG. 14 depicts a general computer architecture on which the present teaching can be implemented.

FIG. 14 provides a functional block diagram illustration of a computer hardware platform which includes user interface elements. The computer may be a general purpose computer or a special purpose computer. This computer 1400 can be used to implement any components of the dynamic web page generation architecture as described herein. For example, the template generator that produces a template for a dynamically generated web page based on a user query, the dynamic web page generator that produces a dynamically generated web page based on a template with an adaptive focus, the dynamic page update module that detects active content on a page and dynamically update it in real-time, can all be implemented on a computer such as computer 1400, via its hardware, software program, firmware, or a combination thereof. Although only one such computer is shown, for convenience, the computer functions relating to DCP processing may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of receiving user queries and returning a response, e.g., a URL associated with dynamically generated web pages or the content contained in the dynamically generated web pages, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other DCP service provider into the hardware platform(s) of a computing environment or other system implementing a computing environment or similar functionalities in connection with generating the dynamic web pages based on user queries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the DCP generation engine and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for generating dynamic content, comprising the steps of:
    receiving, via the communication platform, a request and associated information to generate a dynamic content page (DCP), wherein the associated information comprises a characterization of the request related to a first topic;
    obtaining, by one of the at least one processor, a template based on the request and the associated information, the template comprising a specification of a plurality of pieces of content to be included in the DCP and a layout in which the plurality of pieces of content is to be arranged in the DCP;
    generating, by one of the at least one processor, the DCP that comprises the plurality of pieces of content identified and arranged based on the template;
    providing, by one of the at least one processor, the DCP as a response to the request;
    detecting, by one of the at least one processor, a change in the characterization of the request;
    changing, by one of the at least one processor, the template used to generate the DCP based on information related to the detected change, in response to the detection of the change in the characterization of the request, wherein the changed characterization is related to a second topic different from the first topic; and
    updating, by one of the at least one processor, the DCP based on the changed template.

2. The method of claim 1, further comprising the step of obtaining the plurality of pieces of content from respective sources, the respective sources including at least one of a content provider, a feed source, a content dealer, or a content user.

3. The method of claim 1, further comprising the steps of:
    analyzing the request to obtain the characterization of the request; and
    generating the DCP in accordance with the characterization of the request, wherein the associated information includes at least one of information related to the user, a query history of the user or another user, information related to a location, and the characterization of the request.

4. The method of claim 1, wherein the step of updating the DCP comprises steps of:
receiving dynamic information in connection with the plurality of pieces of content;
determining, based on the dynamic information, at least one of the plurality of pieces of content to be updated;
obtaining an update with respect to the at least one piece of the content in the DCP that is to be updated; and
modifying the at least one piece of the content in the DCP based on the update to generate an updated DCP.

5. The method of claim 1, further comprising the steps of:
associating a locator with the DCP such that the DCP is be subsequently located through the locator.

6. The method of claim 1, wherein the characterization of the query comprises a topic, a theme, and/or one or more focal points associated with the topic and/or the theme.

7. A method implemented on a machine having at least one processor, storage, and a communication platform connected to a network for a search engine, comprising steps of:
storing, in a database storage, a plurality of dynamic content pages (DCPs), a first DCP of the plurality of DCPs comprising a plurality of pieces of content identified and arranged based on a template related to a first topic;
receiving, via the communication platform, a query from a user;
analyzing, by one of the at least one processor, the query to obtain a characterization of the query, the characterization of the query related to the first topic;
obtaining, by one of the at least one processor, one or more pieces of content based on the characterization of the query, wherein the one or more pieces of content include the first DCP;
returning the one or more pieces of content to the user as a response to the query;
detecting, by one of the at least one processor, a change in the characterization of the query, wherein the changed characterization of the query related to a second topic different from the first topic;
changing, by one of the at least one processor, the template related to the first topic based on information related to the detected change, in response to the detection of the change in the characterization of the query; and
updating, by one of the at least one processor, the one or more pieces of content based on the changed template.

8. The method of claim 7, further comprising the step of determining the first topic based on the characterization of the query.

9. The method of claim 7, further comprising the steps of:
obtaining the template based on the first topic, wherein the template comprises a specification of the plurality of pieces of content to be included in the first DCP and a layout in which the plurality of pieces of content is to be arranged in the first DCP;
generating the first DCP by identifying and arranging the plurality of pieces of content in accordance with the template; and
associating a locator with the first DCP so that the first DCP can be subsequently located through the locator.

10. The method of claim 7, wherein updating the first DCP comprises:
receiving dynamic information in connection with the plurality of pieces of content;
determining, based on the dynamic information, at least one of the plurality of pieces of content to be updated;
obtaining an update with respect to at least one piece of the content in the first DCP that is to be updated; and
modifying the at least one piece of the content in the first DCP based on the update to generate an updated DCP.

11. The method of claim 10, wherein the dynamic information includes at least one of:
an input from the user while the user is accessing the first DCP;
an update to any piece of the plurality of pieces of content in the first DCP; and
an update to the template for the first DCP.

12. The method of claim 7, wherein the first topic or the second topic comprises a topic, a theme, and/or one or more focal points associated with the topic and/or the theme.

13. The method of claim 9, wherein updating the one or more pieces of content in response to the detection of the change in the characterization of the query further comprises the step of:
updating the first DCP by modifying the first DCP based on the template updated based on the second topic or by obtaining a second DCP from the plurality of DCPs based on the second topic and replacing the first DCP with the second DCP.

14. A method implemented on a machine having at least one processor, storage, and a communication platform connected to a network for a content provider, comprising the steps of:
providing an archive comprising different pieces of content;
receiving a request that indicates a first topic;
obtaining a first template based on the first topic, the first template comprising a specification of a plurality of pieces of content to be included in a dynamic content page (DCP) and a layout in which the plurality of pieces of content is arranged in the DCP;
generating, by one of the at least one processor, the DCP that comprises the plurality of pieces of content from the archive or another source, identified and arranged based on the first template;
including the DCP as one of the different pieces of content in the archive;
detecting a change in the first topic;
changing, based on information related to the detected change, the first template obtained based on the first topic in response to the detection of the change in the first topic; and
updating the DCP based on the changed first template.

15. The method of claim 14, wherein the step of generating the DCP comprises:
associating a locator with the DCP such that the DCP can be subsequently located through the locator.

16. The method of claim 14, wherein the step of updating the DCP comprises steps of:
receiving dynamic information in connection with the plurality of pieces of content;
determining, based on the dynamic information, at least one of the plurality of pieces of content to be updated;
obtaining an update with respect to at least one piece of the content in the DCP to be updated; and
modifying the at least one piece of the content in the DCP based on the update to generate an updated DCP.

17. A system having at least one processor, storage, and a communication platform connected to a network for creating dynamic content, the at least one processor configured to execute computer program instructions which cause the system to:
analyze a request to obtain a characterization of the request related to a first topic;

obtain a template based on the characterization of the request, the template comprising a specification of a plurality of pieces of content to be included in a dynamic content page (DCP) and a layout in which the plurality of pieces of content is to be arranged in the DCP;

generate the DCP including the plurality of pieces of content identified and arranged based on the template;

provide the DCP as a response to the request;

detect a change in the characterization of the request;

change the template used to generate the DCP based on information related to the detected change, in response to the detection of the change in the characterization of the request, wherein the changed characterization is related to a second topic different from the first topic; and update the DCP based on the changed template.

18. A system having at least one processor, storage, and a communication platform connected to a network for a search engine, the at least one processor configured to execute computer program instructions which cause the system to:

store a plurality of dynamic content pages (DCPs), a first DCP of the plurality of DCPs comprising a plurality of pieces of content identified and arranged based on a template related to a first topic;

receive a query from a user;

analyze the query to obtain a characterization of the query, the characterization of the query related to the first topic;

obtain one or more pieces of content based on the characterization of the query, wherein the one or more pieces of content include the first DCP;

return the one or more pieces of content to the user as a response to the query;

detect a change in the characterization of the query, wherein the changed characterization of the query related to a second topic different from the first topic;

change the template related to the first topic based on information related to the detected change, in response to the detection of the change in the characterization of the query; and update the one or more pieces of content based on the changed template.

19. The system of claim 18, the at least one processor further configured to execute computer program instructions which cause the system to:

obtain the template based on the first topic, wherein the template comprises a specification of the plurality of pieces of content to be included in the first DCP and a layout in which the plurality of pieces of content is to be arranged in the first DCP;

generate the first DCP by identifying and arranging the plurality of pieces of content in accordance with the template; and associate a locator with the first DCP so that the first DCP can be subsequently located through the locator.

20. The system of claim 19, the at least one processor further configured to execute computer program instructions which cause the system to update the first DCP based on dynamic information in connection with the first DCP.

21. A system having at least one processor, storage, and a communication platform connected to a network for a content provider, the at least one processor configured to execute computer program instructions which cause the system to:

provide a computerized and machine accessible archive comprising different pieces of content;

receive a request that indicates a first topic;

obtain a first template based on the first topic, the first template comprising a specification of a plurality of pieces of content to be included in a dynamic content page (DCP) and a layout in which the plurality of pieces of content is arranged in the DCP;

generate the DCP that comprises the plurality of pieces of content from the archive or another source, identified and arranged based on the first template;

include the DCP as one of the different pieces of content in the archive;

detect a change in the first topic;

change, based on information related to the detected change, the first template obtained based on the first topic in response to the detection of the change in the first topic; and update the DCP based on the changed first template.

22. The system of claim 21, wherein the DCP generation engine comprises:

a DCP generator configured for generating the DCP based on the plurality of pieces of content identified and arranged in accordance with the request; and a locator generator configured for creating an associated locator with respect to the DCP.

23. The system of claim 22, the at least one processor further configured to execute computer program instructions which cause the system to dynamically update the DCP based on dynamic information in connection with the plurality of pieces of content in the DCP.

24. A machine readable non-transitory and tangible medium having information recorded thereon for generating dynamic content, wherein the information, when read by the machine, causes the machine to perform the following:

receiving a request with associated information to generate a dynamic content page (DCP), wherein the associated information comprises a characterization of the request related to a first topic;

obtaining a template based on the request and the associated information, the template comprising a specification of a plurality of pieces of content to be included in the DCP and a layout in which the plurality of pieces of content is to be arranged in the DCP;

generating the DCP that comprises a plurality of pieces of content identified and arranged based on the template;

providing the DCP as a response to the request;

detecting a change in the characterization of the request;

changing the template used to generate the DCP based on information related to the detected change, in response to the detection of the change in the characterization of the request, wherein the changed characterization is related to a second topic different from the first topic; and updating the DCP based on the changed template.

25. The medium of claim 24, wherein the information, when read by the machine, further causes the machine to perform the following:

analyzing the request to obtain the characterization of the request; and generating the DCP in consistent with the characterization of the request, wherein the associated information includes at least one of information related to the user, a query history of the user or another user, information related to a location, and the characterization of the request.

26. The medium of claim 24, wherein the information, when read by the machine, further causes the machine to update the DCP which comprises:

receiving dynamic information in connection with the plurality of pieces of content;

determining, based on the dynamic information, at least one of the plurality of pieces of content to be updated;

obtaining an update with respect to at least one piece of the content in the DCP that is to be updated; and modifying the at least one piece of the content in the DCP based on the update to generated an updated DCP.

27. A machine-readable non-transitory and tangible medium having information stored thereon for a search engine, wherein the information, when read by the machine, causes the machine to perform the following:

storing, in a database storage, a plurality of dynamic content pages (DCPs), a first DCP of the plurality of DCPs comprising a plurality of pieces of content identified and arranged based on a template related to a first topic;

receiving a query form a user;

analyzing the query to obtain a characterization of the query, the characterization of the query related to the first topic;

obtaining one or more pieces of content based on the characterization of the query, wherein the one or more pieces of content include the first DCP;

returning the one or more pieces of content to the user as a response to the query;

detecting a change in the characterization of the query, wherein the changed characterization of the query related to a second topic different from the first topic;

changing the template related to the first topic based on information related to the detected change, in response to the detection of the change in the characterization of the query; and updating the one or more pieces of content based on the changed template.

28. The medium of claim 27, wherein the step of generating comprises:

obtaining the template based on the first topic, wherein the template comprises a specification of a plurality of pieces of content to be included in the first DCP and a layout in which the plurality of pieces of content is to be arranged in the first DCP;

generating the first DCP by identifying and arranging the plurality of pieces of content in accordance with the template; and associating the locator with the first DCP, wherein, through the locator, the first DCP can be subsequently located.

29. The medium of claim 27, wherein the step of generating further comprises updating the first DCP, which comprises:

receiving dynamic information in connection with the plurality of pieces of content;

determining, based on the dynamic information, at least one of the plurality of pieces of content to be updated;

obtaining an update with respect to at least one piece of the content in the first DCP that is to be updated; and modifying the at least one piece of the content in the first DCP based on the update to generate an updated DCP.

30. A machine readable non-transitory and tangible medium having information recorded thereon for a content provider, wherein the information, when read by the machine, causes the machine to perform the following:

providing an archive comprising different pieces of content;

receiving a request that indicates a first topic;

obtaining a first template based on the first topic, the first template comprising a specification of a plurality of pieces of content to be included in a dynamic content page (DCP) and a layout in which the plurality of pieces of content is arranged in the DCP;

generating the DCP that comprises the plurality of pieces of content from the archive or another source, identified and arranged based on the first template;

including the DCP as one of the different pieces of content in the archive;

detecting a change in the first topic;

changing, based on information related to the detected change, the first template obtained based on the first topic in response to the detection of the change in the first topic; and updating the DCP based on the changed first template.

31. The medium of claim 30, wherein the step of generating the DCP comprises:

associating a locator with the DCP such that the DCP is subsequently locatable through the locator.

32. The medium of claim 31, wherein the step of generating further comprises updating the DCP, which comprises:

receiving dynamic information in connection with the plurality of pieces of content;

determining, based on the dynamic information, at least one of the plurality of pieces of content to be updated;

obtaining an update with respect to at least one piece of the content in the DCP that is to be updated; and modifying the at least one piece of the content in the DCP based on the update to generate an updated DCP.

\* \* \* \* \*